(12) United States Patent
Connell, II et al.

(10) Patent No.: US 11,545,012 B2
(45) Date of Patent: Jan. 3, 2023

(54) GUNSHOT DETECTION SYSTEM WITH BUILDING MANAGEMENT SYSTEM INTEGRATION

(71) Applicant: JOHNSON CONTROLS FIRE PROTECTION LP, Boca Raton, FL (US)

(72) Inventors: Thomas Wysong Connell, II, Westminster, MA (US); Alan Levin, III, Bolton, MA (US)

(73) Assignee: JOHNSON CONTROLS FIRE PROTECTION LP, Boca Raton, FL (US)

( * ) Notice: Subject to any disclaimer, the term of this patent is extended or adjusted under 35 U.S.C. 154(b) by 0 days.

(21) Appl. No.: 16/968,934

(22) PCT Filed: Feb. 14, 2019

(86) PCT No.: PCT/IB2019/051205
§ 371 (c)(1),
(2) Date: Aug. 11, 2020

(87) PCT Pub. No.: WO2019/159101
PCT Pub. Date: Aug. 22, 2019

(65) Prior Publication Data
US 2021/0366267 A1 Nov. 25, 2021

Related U.S. Application Data

(60) Provisional application No. 62/637,161, filed on Mar. 1, 2018, provisional application No. 62/631,296, filed on Feb. 15, 2018.

(51) Int. Cl.
*G08B 13/00* (2006.01)
*G08B 13/16* (2006.01)
(Continued)

(52) U.S. Cl.
CPC ......... *G08B 13/1672* (2013.01); *G06F 16/61* (2019.01); *G06F 21/602* (2013.01);
(Continued)

(58) Field of Classification Search
CPC ........ G08B 25/14; G08B 7/066; G08B 17/06; G08B 19/00; G08B 25/014; G08B 25/10; G07C 9/00182
See application file for complete search history.

(56) References Cited

U.S. PATENT DOCUMENTS

| 4,709,330 A | 11/1987 | Yokoi et al. |
| 5,504,717 A | 4/1996 | Sharkey et al. |

(Continued)

FOREIGN PATENT DOCUMENTS

| CN | 102 843 205 B | 12/2012 |
| EP | 1 806 952 A2 | 7/2007 |

(Continued)

OTHER PUBLICATIONS

International Search Report and Written Opinion of the International Searching Authority, dated Jun. 18, 2019, from International Application No. PCT/IB2019/051202, filed on Feb. 14, 2019. 24 pages.

(Continued)

*Primary Examiner* — Ojiako K Nwugo
(74) *Attorney, Agent, or Firm* — HoustonHogle LLP

(57) ABSTRACT

A gunshot detection system detects shooting events within a premises and interacts with building management systems installed within the same premises to guide occupants to safety and/or obstruct or trap an active shooter. Gunshot sensor units detect the gunshots and generate event information based on the detected gunshots. A shooting event response module generates and sends building management instructions to the building management systems. In (Continued)

response, distributed devices of the building management systems perform effect changes within the premises according to the functionality of the distributed devices (e.g. locking/unlocking doors, turning off lights, flashing strobe lights). A control panel of the gunshot detection system presents a graphical user interface for presenting response options and receiving selections of response actions to be performed by the building management systems. The shooting even response module also receives gunshot and building management event data and generates recommendation information based on the event data.

18 Claims, 12 Drawing Sheets

(51) Int. Cl.

| | | |
|---|---|---|
| G08B 17/06 | (2006.01) | |
| G08B 25/10 | (2006.01) | |
| G08B 25/14 | (2006.01) | |
| H04L 41/06 | (2022.01) | |
| G08B 17/00 | (2006.01) | |
| G08B 29/18 | (2006.01) | |
| G08B 29/24 | (2006.01) | |
| G06F 16/61 | (2019.01) | |
| H04W 12/037 | (2021.01) | |
| G06F 21/60 | (2013.01) | |
| G06Q 50/26 | (2012.01) | |
| H04L 9/08 | (2006.01) | |
| H04L 9/14 | (2006.01) | |
| H04W 56/00 | (2009.01) | |
| G08B 19/00 | (2006.01) | |
| G08B 25/04 | (2006.01) | |
| G07C 9/00 | (2020.01) | |
| G08B 7/06 | (2006.01) | |
| G08B 25/01 | (2006.01) | |
| H04W 4/029 | (2018.01) | |
| H04W 4/38 | (2018.01) | |
| H04W 4/90 | (2018.01) | |
| H04W 84/18 | (2009.01) | |
| H04W 84/20 | (2009.01) | |

(52) U.S. Cl.
CPC ....... *G06Q 50/265* (2013.01); *G07C 9/00182* (2013.01); *G08B 7/066* (2013.01); *G08B 17/00* (2013.01); *G08B 17/06* (2013.01); *G08B 19/00* (2013.01); *G08B 25/014* (2013.01); *G08B 25/04* (2013.01); *G08B 25/10* (2013.01); *G08B 25/14* (2013.01); *G08B 29/188* (2013.01); *G08B 29/24* (2013.01); *H04L 9/0894* (2013.01); *H04L 9/14* (2013.01); *H04L 41/06* (2013.01); *H04W 4/029* (2018.02); *H04W 4/38* (2018.02); *H04W 4/90* (2018.02); *H04W 12/037* (2021.01); *H04W 56/0015* (2013.01); *H04W 84/18* (2013.01); *H04W 84/20* (2013.01)

(56) References Cited

U.S. PATENT DOCUMENTS

| | | | |
|---|---|---|---|
| 5,973,998 A | 10/1999 | Showen et al. | |
| 6,552,963 B2 | 4/2003 | Baranek et al. | |
| 6,970,183 B1 | 11/2005 | Monroe | |
| 7,228,429 B2 | 6/2007 | Monroe | |
| 7,411,865 B2 | 8/2008 | Calhoun | |
| 7,460,006 B2 | 12/2008 | Kates | |
| 7,676,194 B2 | 3/2010 | Rappaport | |
| 7,843,356 B2 | 11/2010 | Webb | |
| 7,986,231 B1 | 7/2011 | Bentley et al. | |
| 8,149,649 B1 | 4/2012 | Brinn et al. | |
| 8,806,632 B2 | 8/2014 | Stefanidakis et al. | |
| 9,432,720 B2 | 8/2016 | Kruglick | |
| 9,642,131 B2 | 5/2017 | Bohlander et al. | |
| 9,672,700 B2 | 6/2017 | Lax | |
| 9,672,727 B1 | 6/2017 | Alexander et al. | |
| 9,679,459 B2 | 6/2017 | Crowe | |
| 9,830,932 B1* | 11/2017 | Gunderson | G08B 29/186 |
| 9,888,371 B1 | 2/2018 | Jacob | |
| 10,089,845 B2 | 10/2018 | Skorpik et al. | |
| 10,102,732 B2 | 10/2018 | Gersten | |
| 10,586,109 B1 | 3/2020 | Fowler et al. | |
| 10,657,800 B1* | 5/2020 | Fowler | G08B 29/188 |
| 10,741,058 B1 | 8/2020 | Miller | |
| 10,928,244 B2 | 2/2021 | Warren et al. | |
| 11,133,021 B2 | 9/2021 | Davis et al. | |
| 11,170,619 B2 | 11/2021 | Connell, II et al. | |
| 11,282,536 B2 | 3/2022 | Davis et al. | |
| 2006/0109113 A1* | 5/2006 | Reyes | G08B 25/14 340/541 |
| 2008/0165621 A1 | 7/2008 | Fisher et al. | |
| 2009/0222241 A1 | 9/2009 | Dorogi et al. | |
| 2010/0142715 A1 | 6/2010 | Goldstein et al. | |
| 2010/0271905 A1 | 10/2010 | Khan et al. | |
| 2010/0305778 A1 | 12/2010 | Dorneich et al. | |
| 2011/0169633 A1* | 7/2011 | Lauder | G01S 5/18 340/539.13 |
| 2014/0218518 A1 | 8/2014 | Oliver | |
| 2014/0222943 A1 | 8/2014 | Oleson et al. | |
| 2014/0269199 A1 | 9/2014 | Weldon et al. | |
| 2014/0277609 A1 | 9/2014 | Nye et al. | |
| 2014/0327543 A1* | 11/2014 | Showen | G01S 5/18 340/540 |
| 2014/0340222 A1* | 11/2014 | Thornton | G08B 7/066 340/539.17 |
| 2015/0061869 A1* | 3/2015 | Crowe | G08B 15/02 340/541 |
| 2015/0070166 A1* | 3/2015 | Boyden | G08B 13/1672 340/540 |
| 2015/0077550 A1 | 3/2015 | Apelbaum et al. | |
| 2015/0339913 A1* | 11/2015 | Lyman | G07C 9/00182 340/287 |
| 2015/0347079 A1 | 12/2015 | Price et al. | |
| 2016/0232774 A1* | 8/2016 | Noland | G08B 25/10 |
| 2016/0260307 A1* | 9/2016 | Skorpik | G08B 21/02 |
| 2016/0269397 A1 | 9/2016 | Camenisch et al. | |
| 2016/0379456 A1 | 12/2016 | Nongpiur et al. | |
| 2017/0019264 A1* | 1/2017 | Nugent | H04L 67/52 |
| 2017/0045336 A1* | 2/2017 | Crowe | C06D 7/00 |
| 2017/0069190 A1* | 3/2017 | Hansen | G06V 40/172 |
| 2017/0103643 A1* | 4/2017 | Powers, III | E05G 1/00 |
| 2017/0169686 A1* | 6/2017 | Skorpik | G08B 29/185 |
| 2017/0289650 A1* | 10/2017 | Schattmaier | G06N 5/046 |
| 2017/0301220 A1* | 10/2017 | Jarrell | G05D 1/0022 |
| 2018/0053394 A1* | 2/2018 | Gersten | G08B 21/10 |
| 2018/0122030 A1* | 5/2018 | Raz | G06Q 50/265 |
| 2018/0160278 A1 | 6/2018 | Patel et al. | |
| 2018/0199179 A1* | 7/2018 | Rauner | G08B 25/10 |
| 2018/0308475 A1* | 10/2018 | Locke | G06F 40/279 |
| 2019/0024918 A1* | 1/2019 | Brissette | H05B 47/115 |
| 2019/0130723 A1* | 5/2019 | Thiel | G08B 25/10 |
| 2019/0213901 A1 | 7/2019 | Kur et al. | |
| 2019/0347920 A1 | 11/2019 | Anderson et al. | |
| 2021/0158837 A1 | 5/2021 | Saki et al. | |
| 2021/0202067 A1 | 7/2021 | Williams et al. | |

FOREIGN PATENT DOCUMENTS

| | | |
|---|---|---|
| EP | 3032508 A1 | 6/2016 |
| JP | 2001236822 A | 8/2001 |
| JP | 4973380 B2 | 7/2012 |
| JP | 2017520831 | 7/2017 |
| WO | WO 9110980 | 7/1991 |
| WO | WO 2010039130 | 4/2010 |
| WO | WO 2010111556 | 9/2010 |
| WO | WO 2011134371 | 11/2011 |

(56) References Cited

FOREIGN PATENT DOCUMENTS

| WO | WO 2012092562 | 7/2012 |
|---|---|---|
| WO | WO 2018044553 | 3/2018 |
| WO | WO 2018044556 | 3/2018 |
| WO | WO 2018185723 | 10/2018 |
| WO | WO 2019159098 | 8/2019 |
| WO | WO 2019159099 | 8/2019 |
| WO | WO 2019159100 | 8/2019 |
| WO | WO 2019159102 | 8/2019 |
| WO | WO 2019159103 | 8/2019 |
| WO | WO 2019159104 | 8/2019 |
| WO | WO 2019159105 | 8/2019 |
| WO | WO 2019159106 | 8/2019 |

OTHER PUBLICATIONS

International Search Report and Written Opinion of the International Searching Authority, dated May 21, 2019, from International Application No. PCT/IB2019/051203, filed on Feb. 14, 2019. 13 pages.

International Search Report and Written Opinion of the International Searching Authority, dated May 14, 2019, from International Application No. PCT/IB2019/051204, filed on Feb. 14, 2019. 15 pages.

International Search Report and Written Opinion of the International Searching Authority, dated Jul. 12, 2019, from International Application No. PCT/IB2019/051205, filed on Feb. 14, 2019. 23 pages.

International Search Report and Written Opinion of the International Searching Authority, dated Jun. 12, 2019, from International Application No. PCT/IB2019/051206, filed on Feb. 14, 2019. 13 pages.

International Search Report and Written Opinion of the International Searching Authority, dated Jun. 14, 2019, from International Application No. PCT/IB2019/051207, filed on Feb. 14, 2019. 13 pages.

International Search Report and Written Opinion of the International Searching Authority, dated May 31, 2019, from International Application No. PCT/IB2019/051208, filed on Feb. 14, 2019. 18 pages.

International Search Report and Written Opinion of the International Searching Authority, dated Jul. 23, 2019, from International Application No. PCT/IB2019/051209, filed on Feb. 14, 2019. 20 pages.

International Search Report and Written Opinion of the International Searching Authority, dated May 24, 2019, from International Application No. PCT/IB2019/051210, filed on Feb. 14, 2019. 15 pages.

Partial Search Report dated Apr. 24, 2019, from International Application No. PCT/IB2019/051202, filed on Feb. 14, 2019. 14 pages.

Partial Search Report dated May 17, 2019, from International Application No. PCT/IB2019/051205, filed on Feb. 14, 2019. 13 pages.

Partial Search Report dated May 31, 2019, from International Application No. PCT/IB2019/051209, filed on Feb. 14, 2019. 12 pages.

International Preliminary Report on Patentability dated Aug. 27, 2020 from International Application No. PCT/IB2019/051202, filed Feb. 14, 2019. 14 pages.

International Preliminary Report on Patentability dated Aug. 27, 2020, from International Application No. PCT/IB2019/051203, filed on Feb. 14, 2019. 7 pages.

International Preliminary Report on Patentability dated Aug. 27, 2020, from International Application No. PCT/IB2019/051204, filed on Feb. 14, 2019. 9 pages.

International Preliminary Report on Patentability dated Aug. 27, 2020, from International Application No. PCT/IB2019/051205, filed on Feb. 14, 2019. 23 pages.

International Preliminary Report on Patentability dated Aug. 27, 2020, from International Application No. PCT/IB2019/051206, filed on Feb. 14, 2019. 8 pages.

International Preliminary Report on Patentability dated Aug. 27, 2020, from International Application No. PCT/IB2019/051207, filed on Feb. 14, 2019. 8 pages.

International Preliminary Report on Patentability dated Aug. 27, 2020, from International Application No. PCT/IB2019/051208, filed on Feb. 14, 2019. 12 pages.

International Preliminary Report on Patentability dated Aug. 27, 2020, from International Application No. PCT/IB2019/051209, filed on Feb. 14, 2019. 12 pages.

International Preliminary Report on Patentability dated Aug. 27, 2020, from International Application No. PCT/IB2019/051210, filed on Feb. 14, 2019. 9 pages.

* cited by examiner

GUNSHOT DETECTION SYSTEM WITH BUILDING MANAGEMENT SYSTEM INTEGRATION

RELATED APPLICATIONS

This application is a § 371 National Phase Application of International Application No. PCT/IB2019/051205, filed on Feb. 14, 2019, which claims the benefit under 35 USC 119(e) of U.S. Provisional Application No. 62/631,296, filed on Feb. 15, 2018, and U.S. Provisional Application No. 62/637,161, filed on Mar. 1, 2018, all of which are incorporated herein by reference in their entirety.

This application is related to:

International Application number PCT/IB2019/051202 filed Feb. 14, 2019, entitled "Gunshot detection system with forensic data retention, live audio monitoring, and two-way communication," now International Patent Publication No.: WO 2019/159098;

International Application number PCT/IB2019/051203 filed on Feb. 14, 2019, entitled "Gunshot detection system with master slave timing architecture," now International Patent Publication No.: WO 2019/159099;

International Application number PCT/IB2019/051204 filed on Feb. 14, 2019, entitled "Gunshot detection system with encrypted, wireless transmission," now International Patent Publication No.: WO 2019/159100;

International Application number PCT/IB2019/051206 filed on Feb. 14, 2019, entitled "Gunshot detection system anti-tampering protection," now International Patent Publication No.: WO 2019/159102;

International Application number PCT/IB2019/051207 filed on Feb. 14, 2019, entitled "Gunshot detection system with ambient noise modeling and monitoring," now International Patent Publication No.: WO 2019/159103;

International Application number PCT/IB2019/051208 filed on Feb. 14, 2019, entitled "Gunshot detection system with fire alarm system integration," now International Patent Publication No.: WO 2019/159104;

International Application number PCT/IB2019/051209 filed on Feb. 14, 2019, entitled "Gunshot detection sensors incorporated into building management devices," now International Patent Publication No.: WO 2019/159105; and International Application number PCT/IB2019/051210 filed on Feb. 14, 2019, entitled "Gunshot detection system with location tracking," now International Patent Publication No.: WO 2019/159106.

All of the afore-mentioned applications are incorporated herein by this reference in their entirety.

BACKGROUND OF THE INVENTION

Shooting incidents, involving active shooters shooting victims within buildings such as schools or malls, are increasingly a concern. Identifying and reacting quickly to such incidents can reduce loss of life. For example, first responders need to know if gunshots have actually been fired and the location and number of the fired shots.

In confined areas, such as in a school or a private or public building, detecting and locating the source of gunshots is a complicated problem. A gunshot typically generates several sounds including the gunshot itself, the bullet's bow shockwave, noise from bullet impacts and noise of reflected gunshot sounds. In addition, numerous noises are generated in buildings that may be mistakenly identified as gunshots.

The broad concept of detecting gunshots utilizing acoustics is known. More specifically, it is known to provide a gunshot detection system including an array of acoustic sensors positioned in a pattern which enables signals from the sensors to be employed to not only detect the firing of a gunshot but to also locate the origin of the shot. One main requirement of such a system is the need to accurately distinguish between the sound produced from a gunshot and a host of other ambient sounds. In at least one known arrangement, a microphone is used to detect each sound, which is then amplified, converted to an electrical signal and then the electrical signal is compared with a threshold value above which a gunshot sound is expected to exceed.

Recently, gunshot detection systems with improved accuracy, dependability, and effectiveness have been described. One such system is described in International Publication Number WO 2018/044553, published on Mar. 8, 2018 and entitled "System and Method for Acoustically Identifying Gunshots Fired Indoors." This system provides for low false alarms or false positives and high detection rates by employing two microelectromechanical microphones (MEMs) having different sensitivity levels. Acoustic signals from a first microphone with lower sensitivity (for example, making the anomaly detection microphone essentially deaf to routine sounds) are first analyzed for a peak amplitude level large enough to be a potential gunshot. Then acoustic signals from a second microphone having a higher sensitivity are then analyzed further to confirm that the sound was a gunshot.

Gunshot detection methods have also been proposed that can count the number of gunshots fired, particularly from an automatic or fast acting weapon. One such method is described in International Publication Number WO 2018/044556, published on Mar. 8, 2018 and entitled "Method for Acoustically Counting Gunshots Fired Indoors." In this method, an acoustic signature of captured noise is analyzed to accurately count how many shots are fired. The method can be employed to identify that the gun is an automatic or rapid fire weapon, which information can be provided to emergency personnel.

Additionally, gunshot detection system that can accurately determine where sensed events are located have been proposed. One such system is described in International Publication Number WO 2018/185723, published on Oct. 11, 2018 and entitled "System and Method for Identifying and Locating Sensed Events." Here, a sensor network is employed to detect an event in the form of an audible signal. The event is time stamped and sent to a controller, which evaluates the event as either unique or a multiple detection using the sensor's time of alarm to determine which sensor activated first and to suppress subsequent alarms for the same event. This process is known as de-confliction.

At the same time, many premises with gunshot detection systems are also equipped with one or more building management systems such as access control systems, building automation systems, and/or fire alarm systems. In general, these building management systems are installed within a premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

In general, building management systems include one or more control panels or controllers connected to and controlling distributed devices, which perform the building management functions of the building management system. The controllers and distributed devices communicate via wired and/or wireless networks supporting digital and/or analog communication between the devices.

Access control systems typically include control panels such as system controllers and door controllers, and distributed devices, including door position sensors, access control readers, and actuators like electric door locks, to list a few examples. The access control readers are often installed at access points of the buildings to control access to restricted areas, such as buildings or areas of the buildings. Examples of access points include front and interior doors of a building, elevators, hallways connecting two areas of a building, escalators leading to restricted areas of the building and/or turnstiles. The access control readers read the information of keycards and/or transmitted from mobile computing devices and then the access control systems determine if the individuals are authorized to access the restricted areas. If the individuals are authorized to enter the restricted areas, then the access control readers allow access to the restricted areas by unlocking locked doors or turnstiles, signaling that doors should be unlocked, and/or activating elevators. Alarms can be generated upon unauthorized entry.

Building automation systems will typically include one or more building automation control panels and distributed devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. HVAC systems typically include air handlers and systems of ducts and vents for circulating air throughout the building. Business-specific systems include computer systems, manufacturing systems that include various types of computer-aided machinery and test equipment, and inventory control and tracking systems, in examples.

Fire alarm systems typically include fire control panels that function as system controllers. Fire detection/initiation devices and alarm notification devices are then installed, distributed throughout the buildings and connected to the panels. Some examples of fire detection/initiation devices include smoke detectors, carbon monoxide detectors, flame detectors, temperature sensors, and/or pull stations (also known as manual call points). Some examples of fire notification devices include speakers, horns, bells, chimes, light emitting diode (LED) reader boards, and/or flashing lights (e.g., strobes).

The fire detection devices monitor the buildings for indicators of fire. Upon detection of an indicator of fire such as smoke or heat or flames, the distributed device is activated and a signal is sent from the activated distributed device to the fire control panel. The fire control panel then initiates an alarm condition by activating audio and visible alarms of the fire notification devices of the fire alarm system, which are also distributed around the building. Additionally, the fire control panel will also send an alarm signal to a monitoring station, which will notify the local fire department or fire brigade.

Recently, it has been proposed to use connected services systems to monitor building management systems. Connected services systems are remote systems that communicate with one or more building management systems for one or more premises and are sometimes administered by separate business entities than the owners and/or occupants of the buildings, which contain the building managements systems. For example, the connected services system can be administered by a building management system manufacturer and/or an entity providing service on the building management systems.

SUMMARY OF THE INVENTION

Gunshot detection systems tend to be stand-alone systems that are installed independently of and do not communicate/integrate with existing building management systems such as access control systems, building automation systems, and fire alarm systems, in examples.

In certain circumstances it could be important to control the locks on doors that are proximately related to the location of a sensor that detects a gunshot. For example, in some circumstances it would be beneficial to lock the entry and exit doors to a hallway where a shot is detected. In other circumstances, it might be important to unlock all doors in a facility when a shot is detected in order to allow the occupants the greatest ability to escape. Such functionality requires interaction between the gunshot detection system and the access control system for the building. Such a concept can also be extended to control of elevators, escalators, and/or entry/exit turnstiles, among other examples.

Thus, it would be beneficial to enhance the capabilities of existing gunshot detection systems by providing such integration between the gunshot detection systems and various building management systems.

Moreover, by integrating gunshot detection systems with various building management systems, building owners can make decisions based on active shooter information. Building owners and security personnel, for example, can configure evacuation plans for different scenarios in preparation for an active shooter event, and send evacuation plans to monitors within the buildings and/or to occupants via mobile computing devices or cell phones carried by the occupants, in examples. This configuration process and/or active control of the building management systems before and during a shooting event can be accomplished via a graphical user interface (GUI) rendered on a display of the gunshot detection system control panel, which would present information about the premises, gunshot detection system, building management systems, gunshot detection events, and options for responding, making it intuitive for the building managers to program and/or re-program response plans. For example, the building manager, via the GUI, can pre-program what the evacuation plan will be under certain circumstances including which way certain occupants will be directed out of the building, the messaging that is communicated to the occupants, the strobes and alerts that will be provided, which doors will be unlocked or locked, etc. During an active shooting event, the building manager can re-configure or actively control the response via the GUI.

Control panels of the gunshot detection system and control panels of various building management systems also share information, and enable premises security personnel and first responders to better manage active shooter situations in the facilities. For example, a control panel of the gunshot detection system can receive information indicative of an active shooter at a building. Based upon this information, in one example, a control panel of an access control system at the same facility can lock doors to trap an active shooter, or unlock doors to enable occupants to escape. In another example, a control panel of a fire detection system at the same facility can signal strobe and/or buzzer fire notification devices to distract an active shooter or signal evacuation routes. Thus the integrated gunshot detection system allows the building manager to command the building control system to use building management functions performed by devices of the building management systems as tools to be used against an active shooter or in a hostage situation. These building management functions might include locking or unlocking doors, shutting down power, shutting down lighting and/or controlling climate conditions within the building.

The gunshot detection system also provides event data generated based on detected gunshots to be sent to the cloud (e.g. one or more servers accessible by a public network) for analysis. The cloud analytics system can tap other sources of information including premises information for one or more premises, building management system data from one or more premises, crime data and/or weather data to make a better informed analysis of a situation, generate recommendation information for the building manager and even to control one or more building management systems for other buildings. For example, the recommendation information can be conveyed to nearby buildings so that they can prepare if the attack is wider spread or if the shooter is moving from building to building. Building managers for nearby buildings could then lock their doors so the shooter cannot enter.

In general, according to one aspect, the invention features a system for detecting and responding to gunshots within a premises. The system comprises gunshot sensor units and an event response module. The gunshot sensor units detect gunshots and generate event data for the detected gunshots. The event response module receives the event data and sends instructions to building management systems of the premises based on the event data. In turn, the building management systems perform building management functions based on the instructions.

In one example, the building management systems include access control systems, which control access through access points of the premises. These access points might include doors, elevators, escalators and/or turnstiles. The event response module would send instructions to the access control systems to restrict access through certain access points, allow access through all access points, and/or allow access through certain access points (e.g. pertaining to an evacuation route), in examples.

In another example, the building management systems include building automation systems for controlling power, lighting and/or climate conditions for the premises. In this example, the event response module might send instructions to the building automation systems to shut down power, turn off lights, and/or control climate conditions for the premises.

In yet another example, the building management systems include fire alarm systems, which the event response module could instruct to activate fire notification devices based on the event data and/or predetermined evacuation route information.

The event response module might even send notifications to user devices operated by occupants of the premises based on the event data.

A control panel, comprising a controller and a display, might generate a graphical user interface on the display. The graphical user interface would enable an operator of the control panel to indicate response plan information. The event response module would send the instructions to the building management systems based on the response plan information.

In general, according to another aspect, the invention features a method for detecting and responding to gunshots within a premises. Gunshots are detected and event data for the gunshots are generated. Building management systems of the premises are sent instructions based on the event data, and the building management systems perform building management functions based in response to the instructions.

In general, according to another aspect, the invention features a system for detecting and responding to gunshots within a premises. Gunshot sensor units detect gunshots within the premises and generate event data for the detected gunshots. A control panel receives the event data and, via a controller of the control panel, generates a graphical user interface rendered on a display of the control panel. The graphical user interface enables an operator of the control panel to indicate one or more building management functions to be performed by building management systems of the premises based on the event data.

In general, according to another aspect, the invention features a method for detecting and responding to gunshots within a premises. Gunshots are detected within the premises and event data is generated for the detected gunshots. A graphical user interface is generated and rendered on a display of a control panel. The graphical user interface enables an operator of the control panel to indicate one or more building management functions to be performed by building management systems of the premises based on the event data.

In general, according to another aspect, the invention features a system for detecting and responding to gunshots within a premises. Gunshot sensor units detect gunshots and generate gunshot event data for the detected gunshots. A building management system interface enables an event response module to receive building management system data from one or more building management systems for one or more premises. The event response module receives the gunshot event data and the building management system data via the building management system interface and generates recommendation information based on the gunshot event data and the building management system data.

In general, according to another aspect, the invention features a method for detecting and responding to gunshots within a premises. Gunshots are detected and event data is generated for the detected gunshots. The gunshot event data is received along with building management system data from one or more building management systems for one or more premises via a building management system interface. Recommendation information is generated based on the gunshot event data and the building management system data.

In general, according to another aspect, the invention features a system for detecting and responding to gunshots within a premises. Gunshot sensor units detect gunshots and generating gunshot event data for the detected gunshots. An event response module receives the gunshot event data and retrieves building, weather and/or crime information from one or more databases and generates recommendation information based on the gunshot event data and the building, weather and/or crime information.

In general, according to another aspect, the invention features a method for detecting and responding to gunshots within a premises. Gunshots are detected and event is generated for the detected gunshots. Building, weather and/or crime information is retrieved from one or more databases. Recommendation information is generated based on the gunshot event data and the building, weather and/or crime information.

In general, according to another aspect, the invention features a system for detecting and responding to gunshots within a premises. The system comprises gunshot sensor units and soundbars. The gunshot sensor units detect gunshots and generate gunshot event data for the detected gunshots. The soundbars emit weaponized sound within the premises based on the gunshot event data.

In general, according to another aspect, the invention features a method for detecting and responding to gunshots within a premises. Gunshots are detected, and gunshot event data is generated for the detected gunshots. Weaponized sound is then emitted within the premises based on the gunshot event data.

In general, according to another aspect, the invention features a system for detecting and responding to gunshots within a premises. The system includes panic buttons and a control panel. The panic buttons receive manual input from occupants of the premises. The control panel receives gunshot event data generated by gunshot sensor units based on detected gunshots and takes responsive actions based on the gunshot event data and the manual input received via the panic buttons.

In general, according to another aspect, the invention features a method for detecting and responding to gunshots within a premises. Manual input is received from occupants of the premises via panic buttons, and responsive actions are taken based on gunshot event data generated by gunshot sensor units based on detected gunshots and the manual input received via the panic buttons.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
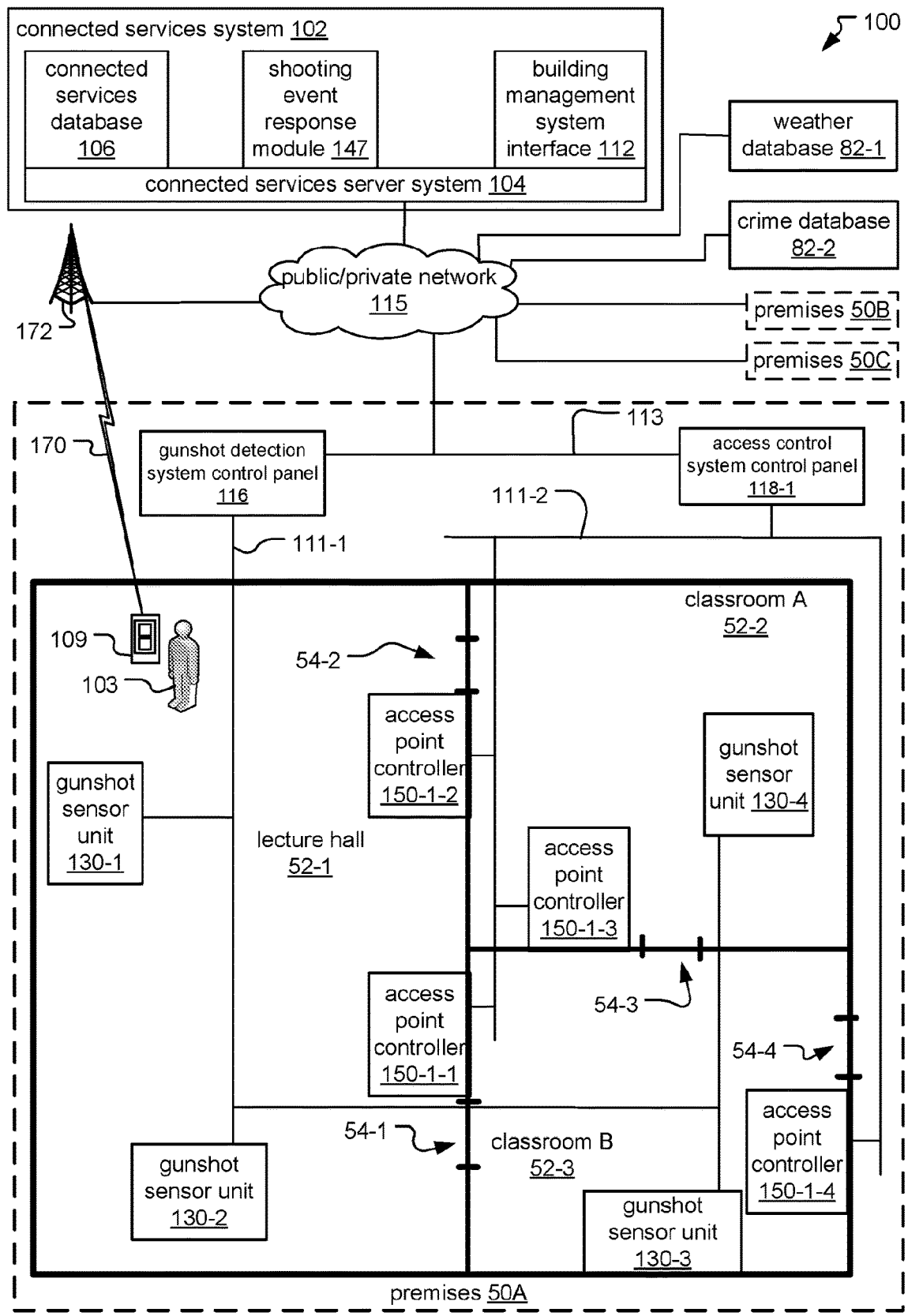
FIG. 1A is a schematic diagram of an exemplary gunshot detection system, according to an embodiment of the present invention, showing integration between the gunshot detection system and an access control system.

FIG. 1A is a schematic diagram of an exemplary gunshot detection system 100 according to an embodiment of the present invention.

In general, the gunshot detection system 100 monitors, detects and reports the occurrence of gunshots or other emergencies within one or more premises 50 such as buildings (e.g. offices, hospitals, warehouses, retail establishments, shopping malls, schools, multi-unit dwellings, government buildings). These premises 50 also include one or more building management systems, which control and monitor various equipment and conditions throughout the premises 50 and can include access control systems, building automation systems, and/or fire alarm systems, among other examples.

Occupants 103 of the premises 50 are individuals who might be located anywhere in the premises 50 during a normal course of business, including employees of entities occupying the premises 50, residents, or visitors, among other examples. The occupants 103 carry and/or operate user devices 109 such as mobile computing devices, which could be laptop computers, tablet computers, phablet computers (i.e., a mobile device that is typically larger than a smart phone, but smaller than a tablet), or a smart watches, to list a few examples.

The illustrated example shows three premises 50A, 50B, 50C. However, for the sake of clarity, only the details of one premises 50A are provided. The premises 50A is a simplified floor example of a building with three areas 52, a lecture hall 52-1, classroom A 52-2, and classroom B 52-3. An occupant 103 is present in the lecture hall 52-1 carrying a user device 109.

The gunshot detection system 100 includes gunshot sensor units 130 and a gunshot detection system control panel 116. The gunshot sensor units 130 detect conditions indicative of the gunshots or other emergencies and alert the control panel 116, which takes one or more responsive actions such as alerting building personnel, law enforcement, and/or a monitoring center, or collecting and presenting data pertaining to the detected gunshots to an operator of the gunshot detection system control panel 116.

Similarly, the building management systems typically include building management system control panels 118 and distributed building management system devices 150 positioned throughout the premises 50. The control panels 118 direct the functionality of the respective building management systems by receiving signals and/or data (for example, from the distributed devices 150), sending instructions, and determining and sending status information or sensor data, among other examples, to be displayed on or utilized by the distributed devices 150.

In both the gunshot detection system 100 and in the building management systems, the gunshot sensor units 130 and distributed devices 150 communicate with their respective control panels 116, 118 over wired and/or wireless communication networks 111. In general, these communication networks 111 support digital and/or analog communication between the gunshot sensor units 130 or distributed devices 150 and the respective control panels 116, 118. In some embodiments (not illustrated), the distributed devices 130 from multiple different building management systems, and even the gunshot sensor units 130 and control panel 116 from the gunshot detection system 100, could all be connected to the same communication network 111. However, in the illustrated example, the gunshot sensor units 130 communicate with the gunshot detection system control panel 116 via the gunshot detection communication network 111-1, and the building management system distributed devices 150 communicate with the building management system control panels 118 via separate building management communication networks 111-2, 111-3, 111-4.

The gunshot sensor units 130 are distributed throughout the premises 50, for example, in areas 52 of the premises such as rooms, hallways, lobbies or stairways, to name a few examples. In the illustrated example, two gunshot sensor units 130-1, 130-2 are located in the lecture hall 52-1, while one gunshot sensor unit 130-2 is located in classroom A 52-2, and one gunshot sensor unit 130-3 is located in classroom B 52-3.

The gunshot sensor units 130 detect acoustic anomalies indicating potential gunshots and generate audio data depicting the acoustic anomalies. The gunshot sensor units 130 also generate event data based on and descriptive of the acoustic anomalies and locally store and/or send the event data to the control panel 116.

The event data often includes audio data (e.g. digitized audio clips) depicting the acoustic anomalies, metadata including, for example, time information indicating when the acoustic anomalies started and/or stopped, duration information for the acoustic anomalies and/or the audio data depicting the acoustic anomalies, file information, and identification information for the gunshot sensor unit 130, and sensor data generated by the gunshot sensor unit 130. The event data can be locally stored, collected by the control panel 116, transferred to remote servers, and/or transferred to devices of law enforcement entities for forensic analysis, for example.

On the other hand, the gunshot detection system control panel 116 directs the overall functionality of the gunshot detection system 100 by sending instructions (e.g. control messages) to be executed by the gunshot sensor units 130, receiving the event data from the gunshot sensor units 130 and taking the responsive actions based on the event data. The control panel 116 might receive preliminary event data (e.g. metadata indicating time and date information) from multiple gunshot sensor units 130 and perform a de-confliction process in order to determine which event data from the different sensor units 130 pertains to the same detected acoustic anomaly and which of the gunshot sensor units 130 is closest to the source of the acoustic anomaly based on, for example, which of the units first detected the acoustic anomaly. The control panel 116 might then send instructions to the gunshot sensor unit 130 closest to the source to send full event data (e.g. including a full audio data sample, environmental data, and other sensor data) to the control panel 116 for further processing and/or to be presented to the operator. The gunshot detection system control panel 116 also presents information to an operator of the control panel 116 such as response options and receives selections, for example, via a graphical user interface (GUI), the selections indicating response information indicating desired responsive actions to take in response to detected shooting events based on the received event data. For example, the response information might include information about building management functions to be performed by the building management systems, evacuation route information indicating paths through the premises 50 for occupants 103 to evacuate, and/or occupant notification information indicating notifications to send to occupants 103 of the premises 50. In another example, the control panel 116 runs an automated predetermined response program by executing responsive actions to be taken (e.g. by the building management distributed devices 150) based on the event data.

The building management system distributed devices 150 are positioned throughout the premises 50 and perform the management and/or automation functions of the building management system. These devices might function as controllers or control panels, sensors, user interface elements, and/or actuators, among other examples. Of these, the sensors detect environmental conditions of the premises 50 and send sensor data to be used by the controllers. The user interface elements present information to occupants 103 of the premises 50 and receive user input (e.g. via touchscreen displays). The actuators effect changes throughout the premises 50 in order to, for example, control the environmental conditions or building equipment. The controllers direct the functionality of the respective building management systems by receiving signals and/or sensor data (for example, from other distributed devices 150 such as the sensors or user interface elements), and generating and sending status information and/or instructions, among other examples, to other distributed devices 150 (for example, to the actuators and/or the user interface elements). Some distributed devices 150 (e.g. thermostats of building automation systems) combine functionality of controllers, sensors, user interface elements and actuators in one device.

More specifically, in the illustrated example, the building management system is an access control system. In general, the access control system controls access through access points 54 (e.g. doors, elevators, escalators, turnstiles) to restricted areas 52 of the premises 50. The access control system includes one or more access control system control panels 118-1, which are connected via the access control communication network 111-2 to access control distributed devices 130, including, for example, access point controllers 150-1 with access control readers for receiving input from the occupants 103 of the premises 50 seeking access through the access points 54 to the restricted areas 52. The access point controllers 150-1 verify the input by, for example, confirming that the occupant 103 who entered the input is authorized to pass through or access the access point 54 based on authorization information, which might include a list of users authorized to enter restricted areas. The access point controllers 150-1 also control access through the access points 54 (e.g. by unlocking a door via a door strike, activating a door opening and/or movement mechanism on an elevator, unlocking a turnstile). In one example, the access control reader includes a wireless receiver, which receives identification information broadcast or otherwise transmitted by the user devices 109 such as mobile computing devices, identification badges, and/or beacon devices of the occupants 103, among other examples.

In the illustrated example, the access control system includes four access point controllers 150-1. Two access point controllers 150-1-1, 150-1-2 are located in the lecture hall 52-1, with one access point controller 150-1-1 controlling the access point 54-1 providing access between the lecture hall 52-1 and classroom B 52-3 and the other access point controller 150-1-2 controlling the access point 54-2 providing access between the lecture hall 52-1 and classroom A 52-2. Another access point controller 150-1-3 is located in classroom A 52-2 and controls the access point 54-3 providing access between classroom A 52-2 and classroom B 52-3. One more access point controller 150-1-4 is located in classroom B 52-3 and controls the access point 54-4 providing access between classroom B 52-3 and an area that is not shown, which could be any elevator, escalator, turnstile, entry/exit door of the premises 50, in examples.

Additionally, the gunshot detection system 100 connects to a connected services system 102, which, at a high level, communicates with one or more building management systems installed at the same premises 50 as the gunshot detection system 100. The connected services system 102 might also communicate with one or more gunshot detection systems 100 and/or building management systems installed at other premises 50.

The gunshot detection system control panel 116, building management system control panel 118 and user devices 109 communicate with the connected services system 102 via one or more networks including a local area network (LAN) 113 for the premises 50 and/or a public and/or private network 115, which can be a leased data connection, a private network built for a specific enterprise client and/or a public network such as the internet, in examples. In some cases, the control panels 116, 118 have been given network connectivity to communicate with the connected services system 102 and are assigned a certificate for authentication purposes; in other cases, computing devices connected to the control panels 116, 118 function as gateways. The user devices 109 connect to the public and/or private network 115 via wireless communication links 170 to a cellular radio tower 172 of a mobile broadband or cellular network or public and/or private wired data networks such as an enterprise network, Wi-Max, or Wi-Fi network, for example. The devices might also connect to the public and/or private network via POTS (e.g. telephone) lines and/or a digital satellite service (DSS), among other examples. The gunshot sensor units 130 and the building management system distributed devices 150 might communicate with the connected services system 102 indirectly via their respective control panels 116, 118 or more directly via the gunshot detection communication network 111-1, the building management system communication networks 111-2, 111-3, 111-4, the LAN 113, and/or the public and/or private network 115.

The connected services system 102 is typically implemented as a cloud system which is a remote system that is only accessible via a public network such as the internet, for example. It can be run on a proprietary cloud system or implemented on one of the popular cloud systems operated by vendors such as Alphabet Inc., Amazon, Inc. (AWS), or Microsoft Corporation. In another example, the connected services system 102 is part of the LAN 113 and/or a private network 115 for the premises 50.

As a result, the connected services system 102 typically operates on a connected services server system 104. In some cases, this server system 104 is one or more dedicated servers. In other examples, they are virtual servers. The connected services server system 104 can also function as an application server that communicates with the user devices 109.

The connected services server system 104 executes modules, including a shooting event response module 147. Each of these modules is associated with separate tasks. In some cases, these modules are discrete modules or they are combined with other modules into a unified code base. They can be running on the same server or different servers, virtualized server system, or a distributed computing system.

The connected services system 104 also includes a connected services database 106, which, in general, stores information about one or more premises 50, including location and/or layout information, building management system information, gunshot detection system information and/or occupant information. In general, the shooting event response module 147 can retrieve this stored information from the connected services database 106 and perform their respective functions based on the retrieved information.

The shooting event response module 147 sends building management instructions to one or more building management systems installed at one or more premises 50. The building management instructions might include instructions for the building management system distributed devices 150 to perform building management functions effecting changes throughout the premises 50 (e.g. locking/unlocking access points, controlling climate conditions, turning on/off lights, turning off power). In a typical embodiment, the shooting event response module 147 sends the building management instructions to the building management system control panels 118, which, in turn, control the distributed devices 150. The shooting event response module 147 might receive the building management instructions from the gunshot detection system control panel 116 and simply relay the instructions to the appropriate building management system control panels 118, or the shooting event response module 147 could receive the gunshot event data generated by the gunshot sensor units 130 and generate the building management instructions based on the gunshot event data. The shooting event response module 147 could depend on input received from the operator of the control panel 116 to generate the building management instructions or it could generate the building management instructions automatically based on the gunshot event data and other available information. In one embodiment, the shooting event response module 147 executes on the gunshot detection system control panel 116 itself, the control panel 116 being configured to communicate with and send instructions to the building management system control panels 118 directly via the LAN 113, for example.

The shooting event response module 147 also generates recommendation information pertaining to shooting events based on gunshot event data and other available information such as premises information, building management system event data received from one or more building management systems installed at one or more premises 50, and even information available, for example, through public databases 82 such as a weather database 82-1 indicating current and historical weather conditions in different locations, and a crime database 82-2 indicating current and historical crime information including identification and background information for potential active shooters. While the current and historical gunshot event data and building management system event data might be stored by the connected services system 102, the shooting event response module 147 would be configured to retrieve the weather and/or crime information via, for example, public facing application programming interfaces (APIs) for retrieving information from the databases. The shooting event response module 147 could generate queries to these databases based on gunshot event data, retrieve the weather and/or crime information using the queries, and then generate the recommendation information based on the event data and the weather/crime information. The recommendation information is returned to the gunshot detection system control panel 116 to be presented to an operator or could even be sent to control panels 116, 118 and/or other computing devices associated with other premises 50 than the one at which the gunshot events are occurring. For example, the shooting event response module 147 could automatically identify, based on the received gunshot event data, that premises 50B, 50C are near the premises 50A where a shooting is occurring. In this case, the gunshot event response module 147 could then retrieve contact information for building managers of the other premises 50B, 50C and send the contact information to the gunshot detection system control panel 116 at premises 50A to be presented to the operator of the control panel 116, or the module could generate and send notifications to the building managers automatically based on the contact information or even send instructions to the building management systems installed at the other premises 50B, 50C to lock the exterior doors of the buildings.

The connected services system 102 also includes a building management system interface 112. The building management system interface 112 operates as the interface between the shooting event response module 147 and the control panels 116, 118. In particular, the building management system interface 112 converts instructions from the module 147 into instructions that are formatted into the protocol implemented by the particular panel 116, 118 or device 130, 150. Additionally, the building management system interface 112 receives information such as gunshot event data and/or building management system event data from the control panels 116, 118 (e.g. generated by the gunshot sensor units 130 or distributed devices 150) and converts the event data into a uniform format that can be consumed by the module 147, regardless of the underlying protocol implemented by the panels 116, 118, the gunshot sensor units 130 and the distributed devices 150.

Figure 1B:
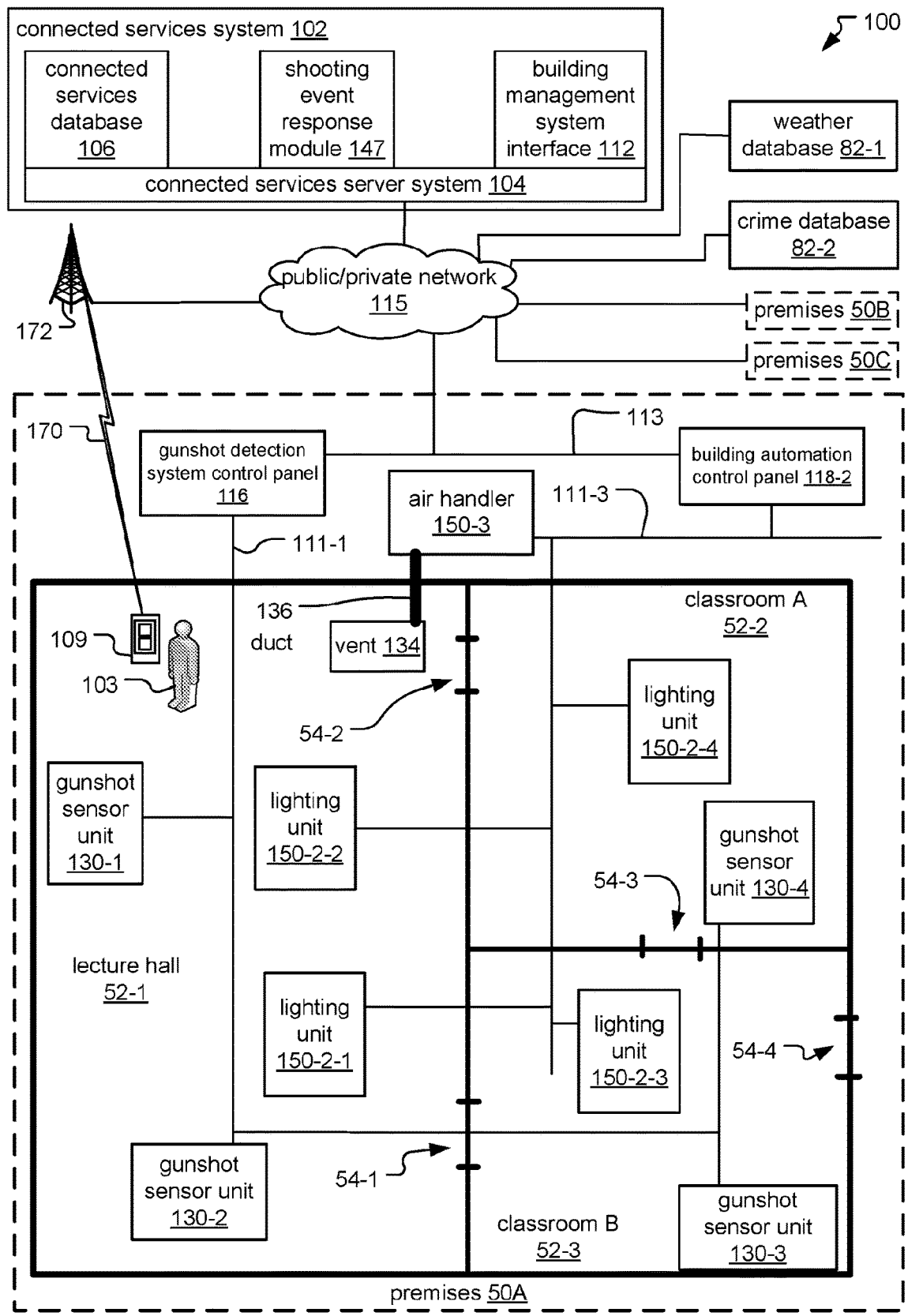
FIG. 1B is a schematic diagram of the gunshot detection system showing integration between the gunshot detection system and a building automation system.

FIG. 1B is a schematic diagram of the gunshot detection system 100 showing integration between the gunshot detection system 100 and a building automation system.

More specifically, among the building management systems installed at the premises 50A is a building automation system, which controls and monitors physical plant aspects of the premises 50 and aspects of business-specific electrical, computer, and mechanical systems. The building automation system includes a building automation control panel 118-2, which is connected via a building automation communication network 111-3 to the building automation distributed devices 150, including an air handler 150-3 and lighting units 150-2, thermostats, projector units, and blinds units, to list a few examples. The air handler 150-3 heats, cools and/or circulates air throughout the premises via ducts 136 and vents 134. The projector unit raises or lowers a projector screen. The blinds units control window coverings such as blinds by, for example, raising, lowering, opening, closing and/or controlling other physical mechanisms for adjusting the amount of light allowed to pass through the window. The lighting units 150-2 control illumination (e.g. of an indoor space), for example, via lighting mechanisms such as light bulbs. The thermostat generates sensor data indicating climate conditions for particular areas of the premises 50 (e.g. via temperature, humidity, and/or other sensors), displays or otherwise indicates status information, receives input indicating climate preferences (e.g. via a touchscreen display or other user interface), and controls the climate conditions by sending the sensor data to the building automation control panel 118-2 and/or sending instructions to the air handler 150-3 based on the sensor data.

In the illustrated example, the building automation system includes an air handler 150-3 and four lighting units 150-2. For the sake of clarity, only one duct 136 and vent 134 are shown in the lecture hall 52-1. Two lighting units 150-2-1, 150-2-2 are located in the lecture hall 52-1, one lighting unit 150-2-4 is located in classroom A 52-2, and one lighting unit 150-2-3 is located in classroom B 52-3.

Figure 1C:
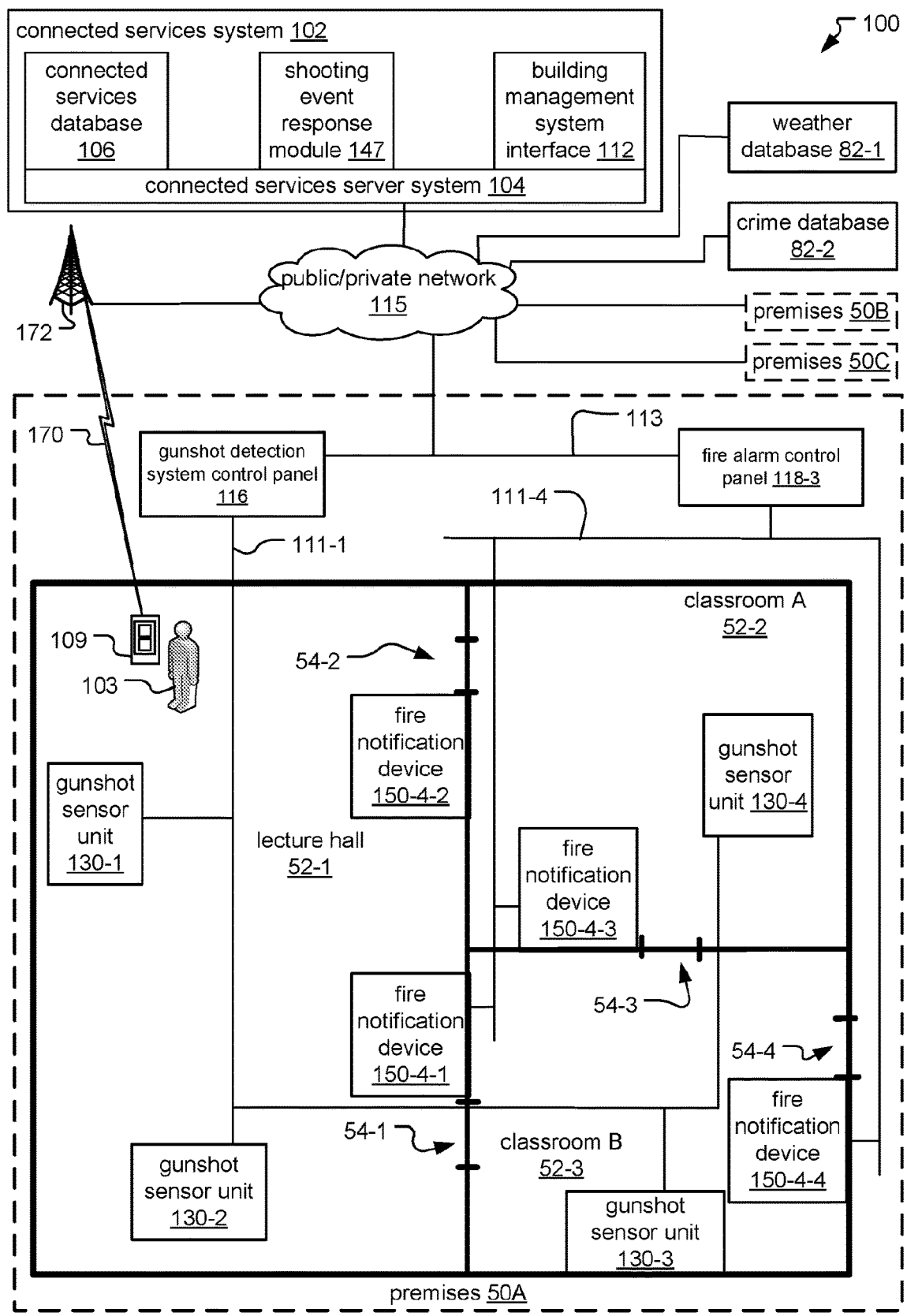
FIG. 1C is a schematic diagram of the gunshot detection system showing integration between the gunshot detection system and a fire alarm system.

FIG. 1C is a schematic diagram of the gunshot detection system 100 showing integration between the gunshot detection system 100 and a fire alarm system.

More specifically, among the building management systems installed at the premises 50A is a fire alarm system. The fire alarm system includes a fire alarm control panel 118-3, which is connected via a fire alarm communication network 111-4 to the fire alarm distributed devices 150. including alarm initiation devices and fire notification devices 150-4. The alarm initiation devices include smoke detectors and manually activated devices such as call points and pull stations, carbon monoxide detectors and heat detectors, to list a few examples. The alarm initiation devices monitor the buildings for indicators of fire. Upon detection of indicators of fire, device signals are sent from the alarm initiating devices to the fire alarm control panel 118-3.

The fire notification devices 150-4, which notify occupants 103 of the premises 50 of a potential fire and generally include sounders, which might include speakers, horns, bells, and/or chimes, and flashing lights (e.g., strobes), light emitting diode (LED) reader boards, to list a few examples. In response to detection of indicators of fire, the fire alarm control panel 118-3 initiates an alarm state, which activates the fire notification devices 150-4.

In the illustrated example, the fire alarm system includes four fire notification devices 150-4. Two fire notification devices 150-4-1, 150-4-2 are located in the lecture hall 52-1, one fire notification device 150-4-3 is located in classroom A 52-2, and one fire notification device 150-4-4 is located in classroom B 52-3.

Figure 2:
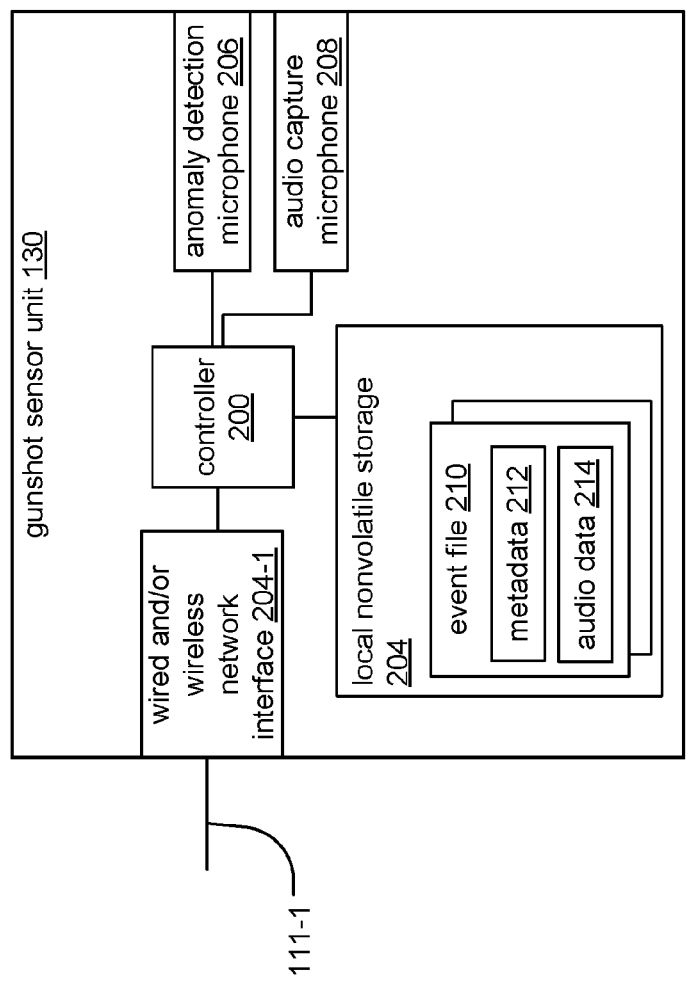
FIG. 2 is a block diagram showing an exemplary gunshot sensor unit of the gunshot detection system.

FIG. 2 is a block diagram showing an exemplary gunshot sensor unit 130.

The gunshot sensor unit 130 includes a controller 200, local nonvolatile storage 202, a wired and/or wireless network interface 204, an anomaly detection microphone 206, and an audio capture microphone 208.

The controller 200 executes firmware/operating system instructions and generally directs the functionality of the gunshot sensor unit 130. In one example, the controller 200 is small single-board computer. In other examples, the controller is a microcontroller unit or a system on a chip (SoC), including one or more processor cores along with memory and programmable input/output peripherals such as analog to digital converts and digital to analog converters.

The wired and/or wireless network interface 204 provides connectivity with the gunshot detection system control panel 116 and possibly other devices via the gunshot detection communication network 111-1. In addition, the network also provides power to the devices, in many examples. Direct current (DC) is superimposed upon the data that is transmitted between the devices and other nodes on the network.

The anomaly detection microphone 206 detects the acoustic anomalies, while the audio capture microphone 208 captures ambient sound and generates the audio data. In one embodiment, both microphones 206, 208 are micro electromechanical system (MEMS) microphones having different sensitivity levels, and the controller 200 is configured to sample the microphones 206, 208 such that outputs from the microphones can be continuously analyzed in near real time for an acoustic signature. The anomaly detection microphone 206 has the lower sensitivity level and a high clipping level, while the audio capture microphone 208 has the higher sensitivity level. The audio capture microphone 208 continuously captures ambient sound, which is stored in a 9.9 second (for example) loop in a ring buffer of the controller 200. At the same time, incoming acoustic signals from the anomaly detection microphone 206 are continuously analyzed to detect acoustic anomalies, particularly by searching the incoming acoustic signal for a peak amplitude level large enough to be at least preliminarily identified as a gunshot.

Once an indication of a possible gunshot has been triggered utilizing the anomaly detection microphone 208, further processing may be performed by the controller 200. The controller 200 analyzes the sound stored in the loop to confirm that the acoustic anomaly is a gunshot. If confirmed as gunshot, the controller stores the captured sound stored in the loop buffer, which would include the acoustic anomaly and the previously captured sound (up to 9.9 seconds, in this example) as audio data 214 in the local nonvolatile storage 202 associated with different event files 210 or instances of event data for different gunshot detection events, along with the metadata 212, which includes the time and/or date information for the events. In embodiments, the local nonvolatile storage 202 could be fixed storage such as flash memory, or removable storage such as an SD card, among other examples.

Figure 3:
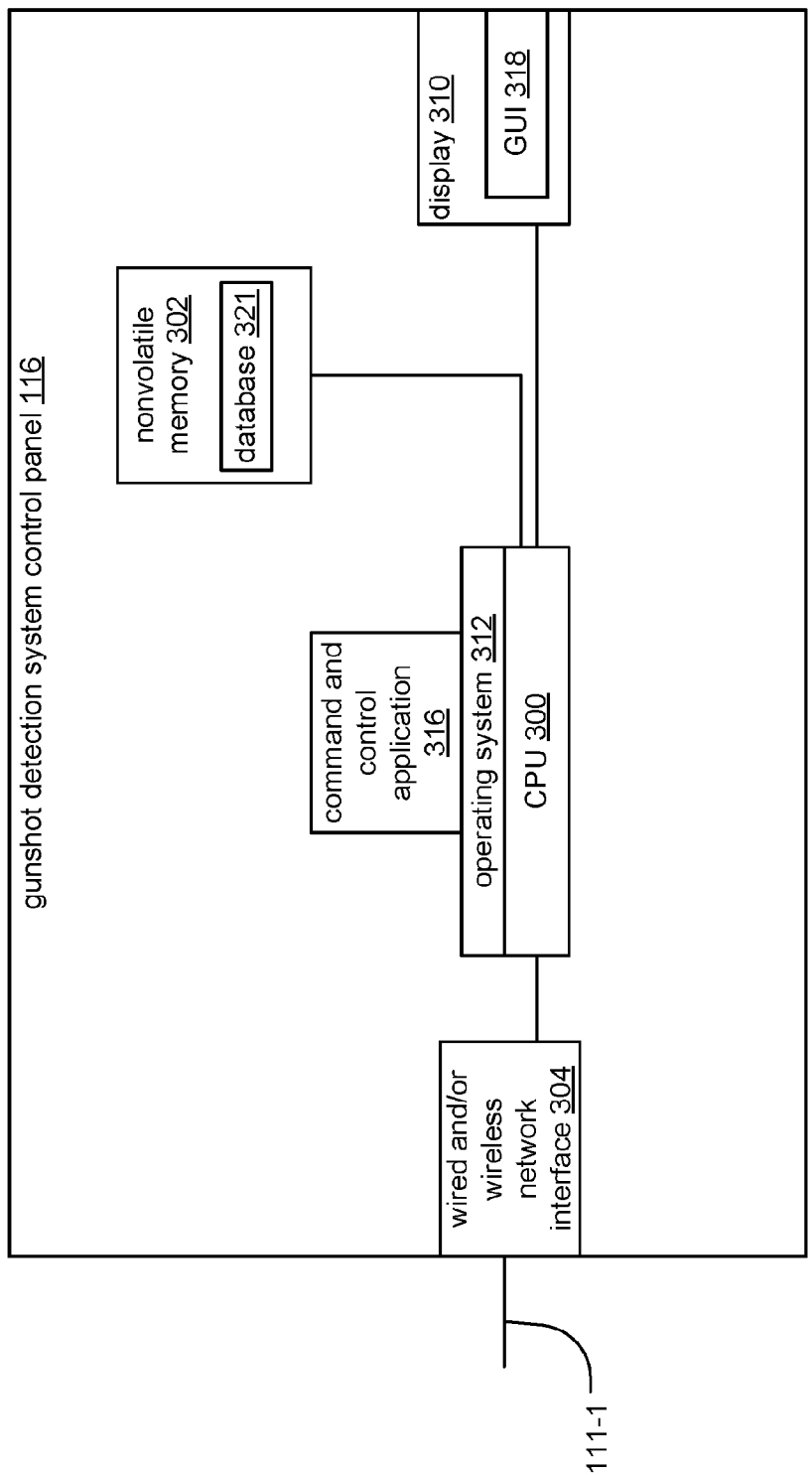
FIG. 3 is a block diagram showing an exemplary control panel of the gunshot detection system.

FIG. 3 is a block diagram showing an exemplary gunshot detection control panel 116.

The control panel 116 includes a central processing unit (CPU) 300, nonvolatile memory 302, a wired and/or wireless network interface 304, and a display 310.

Similar to analogous components on the gunshot sensor units 130, the wired and/or wireless network interface 304 provides connectivity with the gunshot sensor units 130 and possibly other devices via the gunshot detection communication network 111-1 and/or the LAN 113. In some examples, the control panel 116 may also supply power to the units 130.

The CPU 300 executes firmware instructions and an operating system (OS) 312 and generally directs the functionality of the control panel 116. The OS 312 interfaces with the hardware components of the control panel 116 for access by a command and control application 316, which is a software process executing on top of the OS 312.

The nonvolatile memory 302 includes a local database 321 for storing event data including audio data, sensor data, or order information indicating the order in which the gunshot sensor units 130 detected the gunshots. In one embodiment, the connected services database 106 is implemented on the nonvolatile memory 302 of the gunshot detection system control panel 116. In this case the local database 321 might include the premises location/layout information, building management system information, gunshot detection system information and occupant information.

The command and control application 316, in general, generates a graphical user interface (GUI) 318 that is rendered on the display 310 (e.g. touchscreen display) of the control panel 116. In one example, the GUI 318 might present gunshot detection system information, building management system information, gunshot event data, building management event data, premises information, and/or occupant information to an operator of the control panel 116. The GUI 318 also receives input indicating selections of various options for controlling the gunshot sensor units 130 and/or the building management systems, including gunshot event response information. The command and control application 316 also sends gunshot event data to the connected services system and/or stores the event data to the local database 321, generates the building management instructions, and sends the building management instructions to the connected services system 102 and/or the building management system control panels 118.

Figure 4:
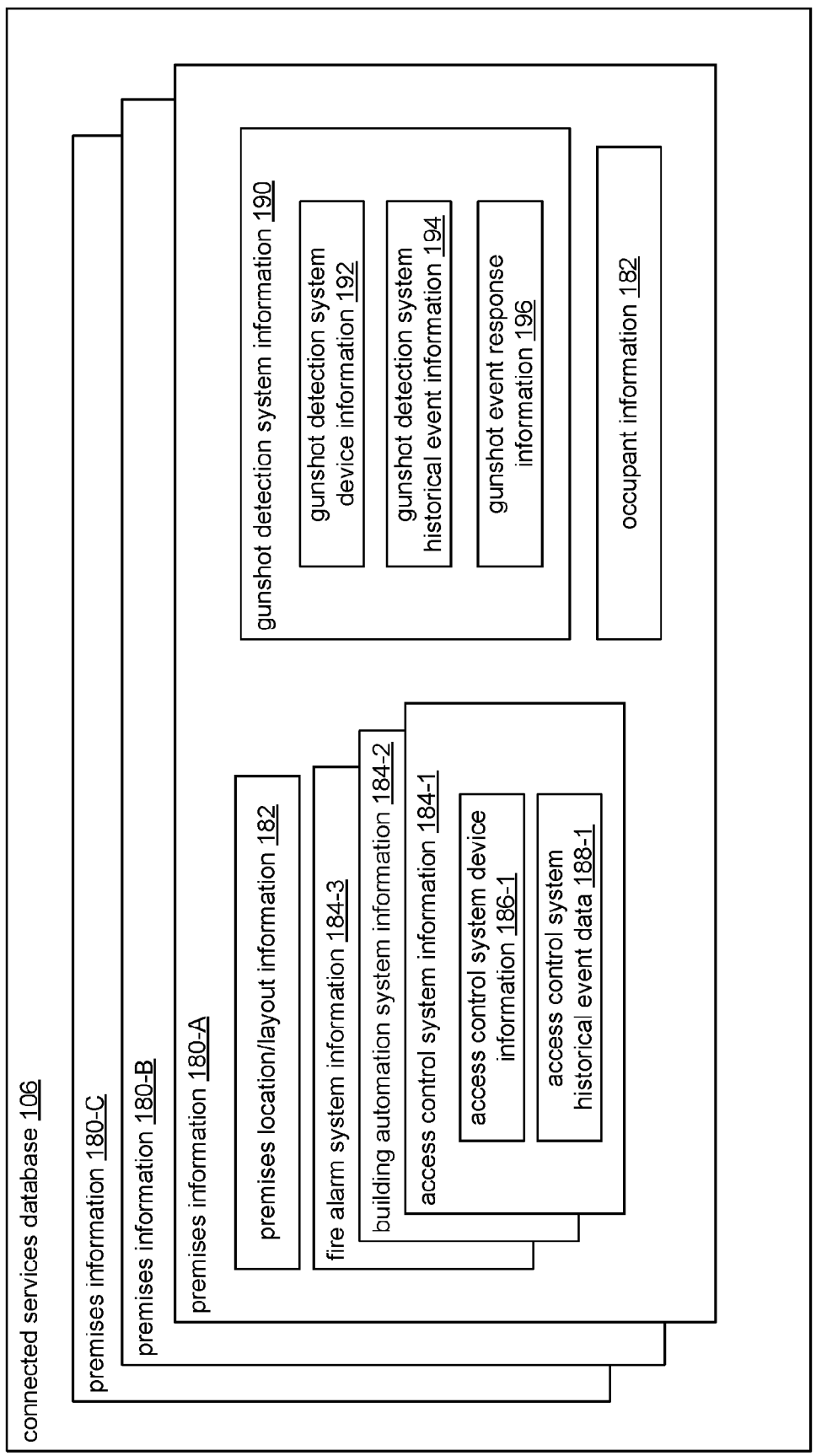
FIG. 4 is a block diagram showing information maintained by an exemplary connected services database of the gunshot detection system.

FIG. 4 is a block diagram of an exemplary connected services database 106 showing, at a high level, information that would be maintained by the connected services database 106. This information could also be maintained locally by the gunshot detection system control panel 116 and stored in the local database 321.

In general, the connected services database 106 stores premises information 180 associated with one or more different premises 50. In the illustrated example, the connected services database 106 includes premises information 180 associated with three different premises 50A, 50B, and 50C. The premises information 180 for each premises 50 includes location and/or layout information 182, building management system information 184, gunshot detection information 190, and occupant information 182.

The premises location and/or layout information 182 indicates information about the location of the premise 50 (e.g. geographical information, address information, global navigation satellite system coordinates and/or location with respect to other premises 50) as well as the interior layout of the premises 50 (e.g. floor plans, maps, location of areas 52 within the premises 50 with respect to each other).

The building management system information 184 indicates information about one or more building management systems installed at the premises 50, including device information 186 and historical event data 188. The device information 186 includes information about the building management system control panels 118 and/or distributed devices 150, including identification information, location information, and information about capabilities of the devices, among other examples. The historical even data 188 includes current and past event data for the building management system, indicating building management events such as operational status information for the devices (e.g. indicating whether the devices are operating normally or have failed due to tampering, gunfire, or explosions), actions performed by the distributed devices 150, sensor data, and/or status changes, including time and date information for the events. In the illustrated example, the premises information 180-A for premises 50A includes fire alarm system information 184-3, building automation system information 184-2 and access control system information 184-1, for the fire alarm system, building automation system, and access control system, respectively, installed at the premises 50A.

Similarly, the gunshot detection system information 190 includes device information 192 and historical event information 194 as in the building management system information 184. Additionally, however, the gunshot detection system information 190 includes gunshot event response information 196. The device information 192, as before, includes information about the gunshot detection system control panel 116 and/or the gunshot sensor units 130, including identification information and location information. The historical event information 194 includes past and current gunshot event data, including time, date, location (e.g. route of active shooter through building), and device information for shooting events in the premises 50. The gunshot event response information 196 includes response action information indicating actions and/or functions to be taken by the gunshot detection system 100, the connected services system 102, and/or the building management systems in response to detecting gunshots and/or operator input received by the gunshot detection system control panel 116, evacuation plan information, which might include different predetermined evacuation routes through the premises 50, and occupant notification information indicating different notification actions to be taken by the connected services system 102 and/or the control panel 116 to provide information and/or guidance to occupants 103 of the premises 50 during an active shooting event. In addition to the different response actions, evacuation plans and/or notification actions, the gunshot event response information 196 might also include criteria for automatically selecting between the response actions, evacuation plans and/or notification actions to be performed (e.g. without further input from the operator of the control panel 116). In any case, the gunshot event response information 196 is generated based on input received via the GUI 318 from the operator of the control panel 116 and stored in the connected services database 106 and/or local database 321 for retrieval during active shooter events, for example.

The occupant information 182 indicates information about the occupants 103 of the premises 50 including identification information, location information (e.g. normal department location, apartment number, current location based on indoor tracking system data), contact information and device information for the user device 109.

Figure 5:
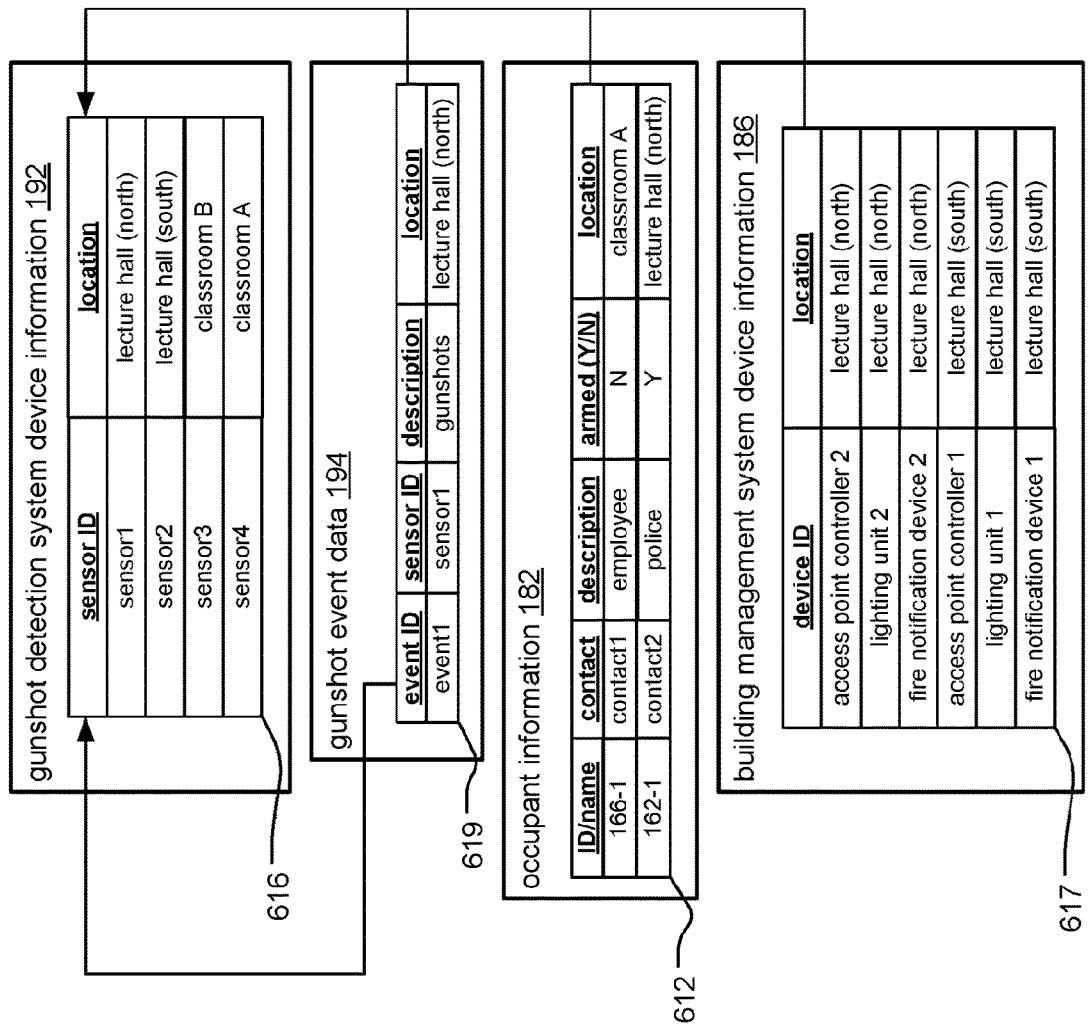
FIG. 5 is a diagram showing the information stored in the connected services database in additional detail.

FIG. 5 is a diagram showing the gunshot detection system device information 192, the gunshot event data 194, the occupant information 182, the building management system device information 186 and the gunshot event response information 196 in more detail.

The gunshot detection system device information 192 includes an exemplary sensor table 616, which includes a sensor ID column and a location column. The sensor ID column includes unique identification information for the units. The location column location information indicating a location within the premises 50 (e.g. a room or part of a room) where the gunshot sensor unit 130 is positioned.

The gunshot event data 194 includes a gunshot event table 619. The gunshot event table 619 includes recorded event information for ongoing or past gunshot events and includes columns for event ID, sensor ID, description, and location. The event ID column includes unique identification information for each event, which can refer either to collective shooting events or discrete gunshot detection events in different examples. The sensor ID column identifies the gunshot sensor unit 130 or units involved in the event, referring, for example, to values in the sensor ID column in the sensor table 616. The description column includes, for example, descriptive text about the event that might be presented to operators of the control panel 116. The event location column includes location information for the event, including, for example, a discrete location of detected gunshots and/or inferred route information for active shooters. The event location column might refer to values in the sensor location column in the sensor table 616.

The occupant information 182 includes an occupant table 612. The occupant table 612 includes information about occupants 103 of the premises 50 and includes columns for occupant ID, contact information, description, armed status and occupant location. The occupant ID column includes unique identification information for each occupant 103. The contact column includes contact information for each occupant 103 such as phone numbers, email addresses, and/or user device information for sending push notifications to the user devices 109. The description column includes descriptive text about the occupant such as the occupant's 103 relationship to the shooting event (e.g. employee, police, suspected shooter). The armed status column indicates whether each occupant 103 is armed with a weapon. The occupant location column includes location information for the occupant 103 indicating a location within the premises 50 where the occupant 103 is known and/or expected to be located. Values in the occupant location columns might refer to the same values in the event column of the gunshot event table 619 and/or the sensor location column in the sensor table 616.

The building management system device information 186 includes a building management system device table 617, which includes columns for device ID and device location. The device ID column includes unique identification information for building management system control panels 118 and/or distributed devices 150. The device location column includes location information for each of the control panels 118 and/or distributed devices 150, referring, for example, to values in the occupant location column of the occupant table 612, the event location column in the gunshot event table 619 and/or the sensor location column in the sensor table 616.

As illustrated, the gunshot detection system device information 192, the gunshot event data 194, the occupant information 182 and the building management system device information is maintained by the connected services database 106 in such a way that relationships between the different entities are identified and can be used by the command and control application 316, shooting event response module 147 to generate the building management instructions and the recommendation information.

The gunshot event response information 196 includes an action table 610, an evacuation plan table 618, and an occupant notification table 620. The tables include descriptive text identifying (e.g. for presentation to an operator) actions to be taken by the building management systems, evacuation plans and notification actions to be taken by the connected services system 102 and/or the control panel 116. However, in addition to including the descriptive text, each of the items in each table might represent preconfigured instructions to be sent to and/or executed by the connected services system 102, building management systems and the control panel 116. These instructions might include variables that are distinct for each different gunshot event such that execution of the instructions is additionally based on the gunshot event data 194 and/or occupant information 182, to list a few examples.

The action table 610 identifies configured actions to be taken by the building management systems based on the gunshot event data and/or input received from the gunshot detection system control panel 116 from the operator of the control panel. The actions include shutting off lights via the lighting units 150-2, locking down classrooms via the access point controllers 150-1, opening all doors in the premises 50 via the access point controllers 150-1, creating evacuation plans, for example, by prompting the operator of the control panel 116 for input indicating selections of locations, devices and/or access points 52 representing a route through the premises 50, and trapping an active shooter (e.g. locking all access points 52 in vicinity of the shooter via the access point controllers 150-1).

The evacuation plan table 618 identifies configured evacuation routes and possibly actions to be taken by the building management systems with respect to the evacuation routes. The evacuation routes include a cafeteria evacuation route, a classroom A evacuation route, a classroom B evacuation route, two lecture hall evacuation routes, a gymnasium evacuation route, and a custom route. The evacuation routes referring to areas 52 of the premises 50 might refer to evacuation routes to be followed by occupants 103 who are currently in those areas 52 based on the occupant information 182 or to different alternative routes to take based on where the active shooter is located, for example. Each route might also represent instructions such as sending notifications to the user devices 109 of the occupants 103 informing them of their route based on the defined evacuation routes in the evacuation plan table 618, the location information for the occupant 103 and/or the gunshot event data 194. The items in the evacuation plan table 618 could also represent instructions to be sent to and executed by the building management systems, including instructions to unlock all of the access points 52 along the routes via the access point controllers 150-1 and instructions to indicate the evacuation routes via the fire notification devices 150-4 (e.g. by activating strobes and/or buzzers along the evacuation routes).

The occupant notification table 620 identifies configured notification actions to be taken by the connected service system 102 and/or the control panel 116 such as sending text messages, emails and/or push notifications to the user devices 109 of the occupants 103. The items in the occupant notification table 620 might represent textual information to be included in the notifications. This textual information might be predetermined such as instructions to shelter in place, barricade access points 52, enforce silence by making no noise, placing cell phones on silent/mute (with no ringing or vibrating), and following the evacuation plan/route. The textual information could be determined at the time of executing the action, such as custom messages that are input, for example, by the operator of the control panel 116, before the notifications are sent.

Figure 6:
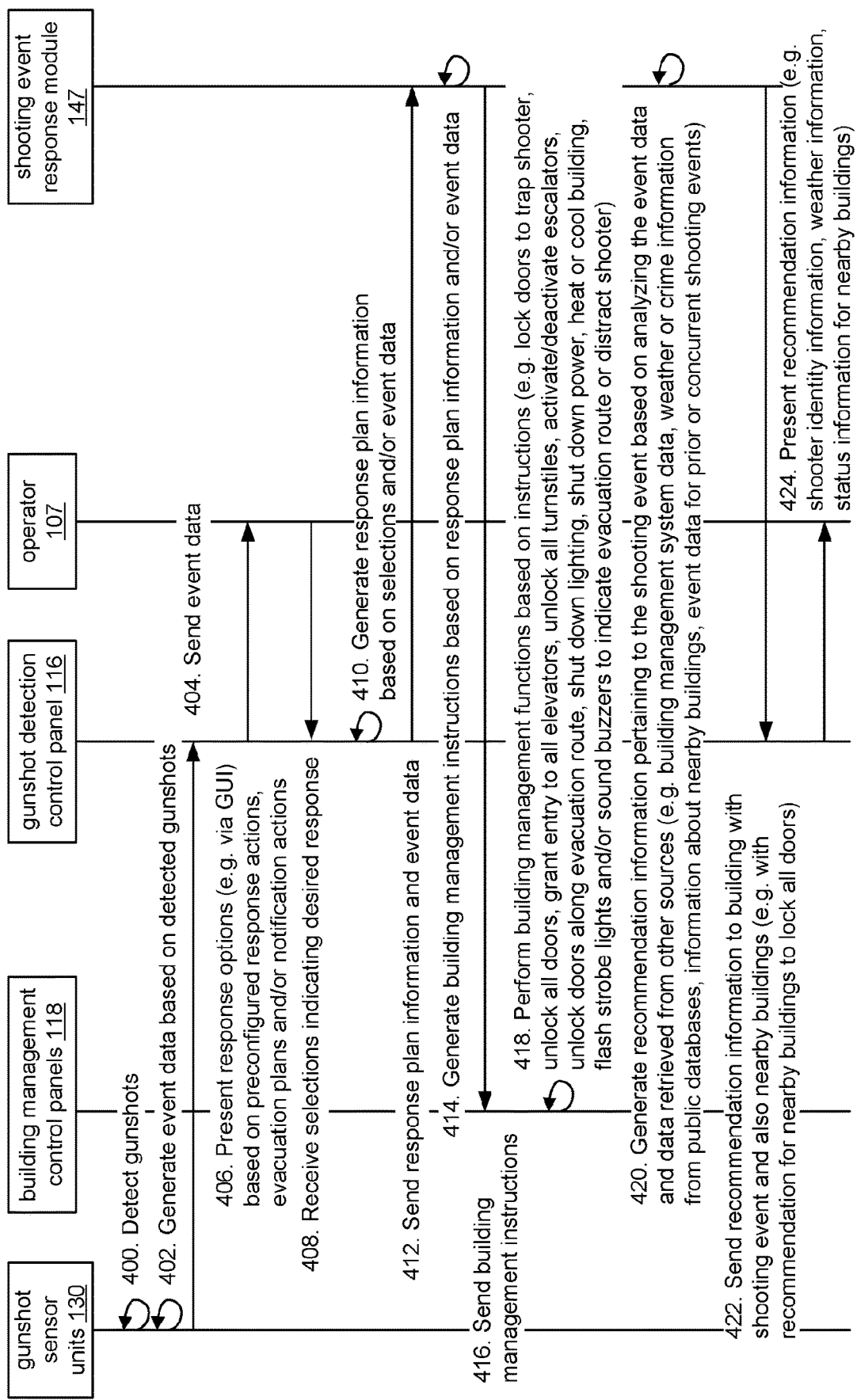
FIG. 6 is a sequence diagram illustrating the process by which the building management systems perform building management functions based on instructions generated by the gunshot detection system.

FIG. 6 is a sequence diagram illustrating the process by which the building management system performs building management functions for the premises 50 based on instructions generated by the gunshot detection system 100.

First, in step 400, one or more of the gunshot sensor units 130 detect gunshots. The gunshot sensor units 130 detect acoustic anomalies indicative of the gunshot via the anomaly detection microphones 206, for example, by searching the incoming acoustic signal from the anomaly detection microphone 206 for a peak amplitude level large enough to be identified as a gunshot.

In step 402, the gunshot sensor units 130 generate event data, for example, by recording timestamps for the detected shots and audio data via the audio capture microphone 208. The gunshot sensor units 130 send the event data to the gunshot detection system control panel 116 in step 404.

In step 406, the gunshot detection system control panel 116 presents (e.g. via the GUI 318) response options to an operator 107 of the control panel. The response options, for example, are based on preconfigured response actions, evacuation plans and/or notification actions such as those maintained in the action table 610, the evacuation plan table 618 and/or the occupant notification table 620 by the connected services database 106. In step 408, the gunshot detection system control panel 116 receives the elections indicating a desired response from the operator 107.

In step 410, the gunshot detections system control panel 116 generates response plan information based on selections and/or event data. The response plan information might simply indicate the desired response plan or might include information about building management functions to be performed by the building management systems, for example. The gunshot detection system control panel 116 sends the response plan information and the event data to the shooting event response module 147 in step 412.

In step 414, the shooting event response module 147 generates building management instructions based on the response plan information and/or the event data and, in step 416, sends the building management instructions to the building management control panels 118 for building management systems at the premises 50.

In step 418, the building management control panels 118 perform building management functions based on the building management instructions by controlling building management distributed devices 150 which effect changes in the premises 50 based on the instructions. In one example, the access control system control panel 118-1 might send instructions to lock and/or unlock doors to the access point controllers 150-1, which, in response to the instructions, lock doors to trap the shooter, unlock all doors, grant entry to all elevators, unlock all turnstiles at entry/exit points of the premises 50, activate/deactivate escalators, and/or unlock certain doors along an evacuation route. In another example, the building automation control panel 118-2 sends instructions to lighting units 150-2, air handlers 150-3 and/or other distributed devices 150, which, in response to the instructions, shut down lighting, shut down power to the premises 50, close window blinds to hide sheltering individuals, and/or cause the building to become hotter or colder. In another example, the fire alarm control panel 118-3 might send instructions to fire notification devices 150-4 to flash strobe lights and/or emit sounds via buzzers to indicate an evacuation route or distract the shooter. In another example, the fire alarm control panel 118-3 might receive a fire alarm signal from a fire initiation device such as a pull station and, in response, trigger a fire alarm condition. Based on the response plan information and/or other configuration settings, the shooting event response module 147 then in response sends instructions to the fire alarm control panel 118-3 to reset the fire alarm condition triggered by the pull station and to continue to override the fire alarm signals received from the pull station until a fire sensor retriggers the alarm, for example, in response to detecting smoke, heat or other indications of fire.

In step 420, the shooting event response module 147 also generates recommendation information pertaining to the shooting event based on an analysis of the event data and other available information such as the premises information 180, premises location and/or layout information 182, building management system information 184, gunshot detection information 190 and occupant information 182 for one or more premises 50, and information from public databases 82 such as weather information and/or crime information.

In step 422, the shooting event response module 147 sends the recommendation information to the gunshot detection system control panel 116 of the premises 50 where the shooting is in progress as well as to other gunshot detection system control panels 116 of other premises 50. The gunshot detection control panels 116 present the recommendation information to the operators 107. This information might include identification information for the suspected shooter, weather information, and/or status information for nearby premises 50. In another example, the recommendation information generated by the shooting event response module 147 might include information inferred based on the operational status of different building management distributed devices 150 (e.g. from the building management system information 184), which might have been damaged due to deliberate tampering, gunfire, or explosions related to the shooting event. The shooting event response module 147 then, from this information, infers the number, direction of movement, previous, current and/or predicted paths of active shooters, among other examples.

Figure 7A:
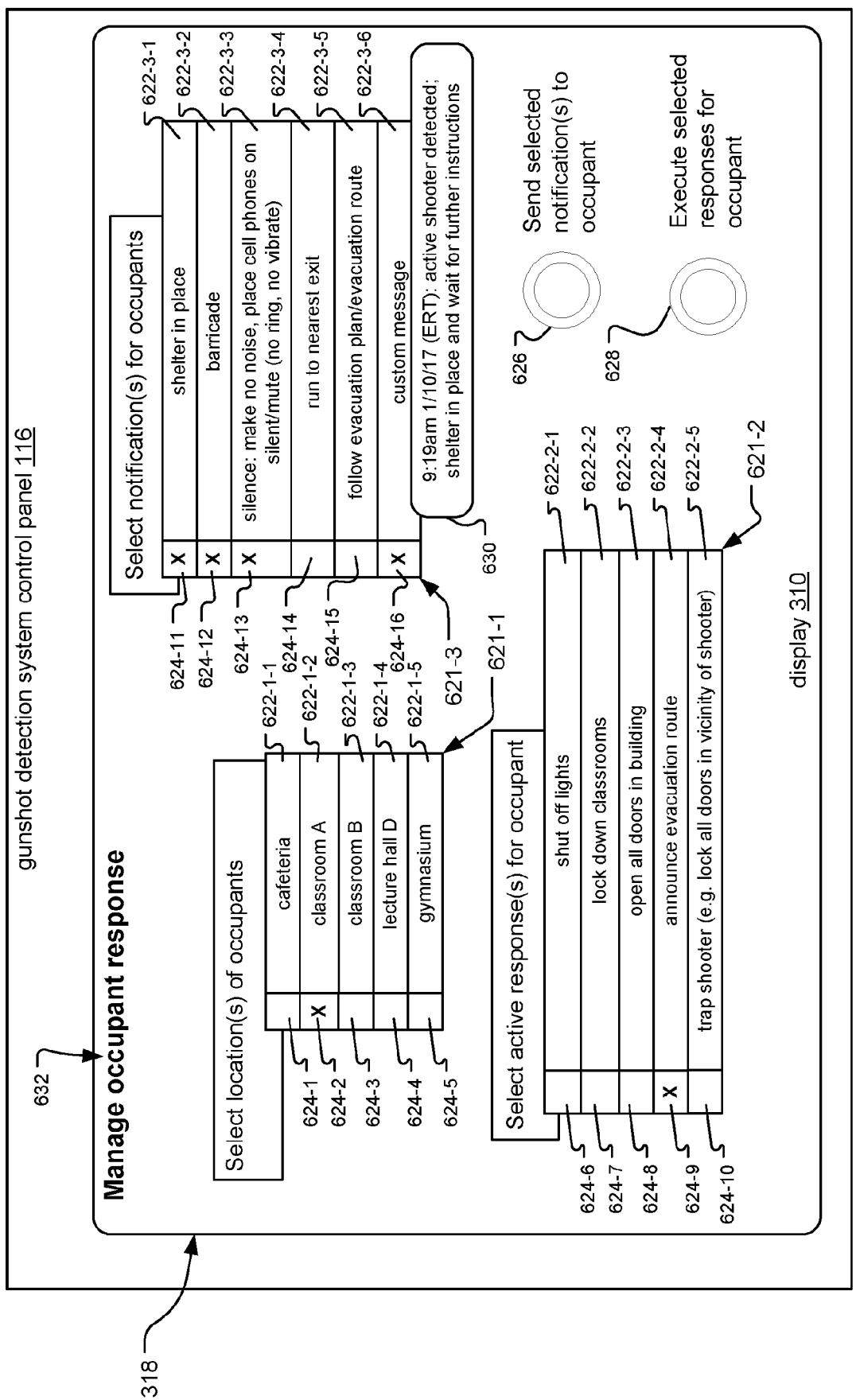
FIG. 7A shows an exemplary manage occupant response screen of a graphical user interface rendered on a display of the control panel.
Figure 7B:
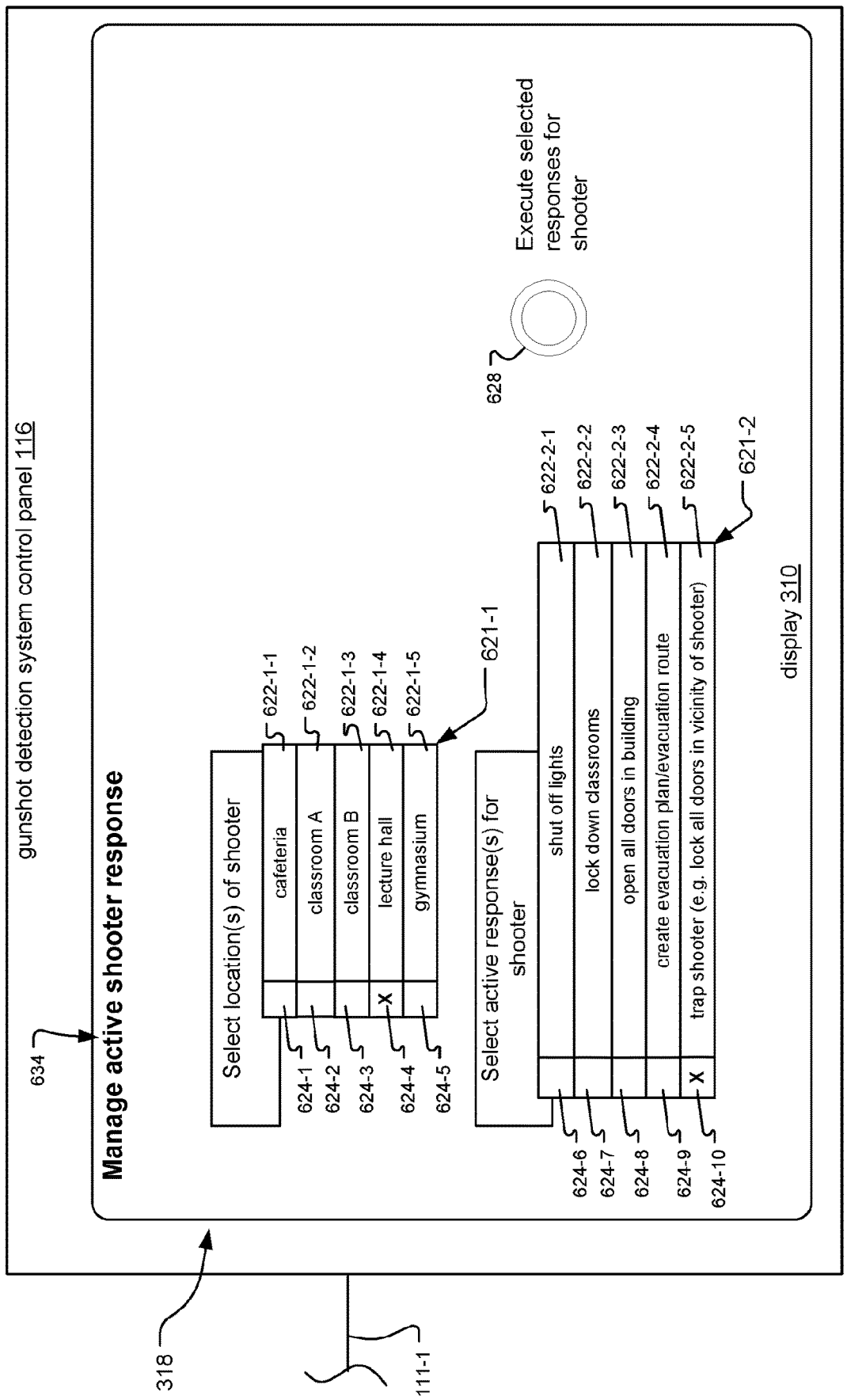
FIG. 7B shows an exemplary manage shooter response screen of the graphical user interface.

FIGS. 7A and 7B are illustrations of exemplary screens of the GUI 318 rendered on the touchscreen display 310 of the gunshot detection system control panel 116. In general, the screens include various graphical elements including indicators, virtual buttons, and other input mechanisms such as selection boxes 624 and message input boxes 630. The indicators represent objects, locations, actions, and/or options pertaining to the gunshot detection system 100, the shooting event, the premises 50 and/or the building management systems. The indicators include textual information descriptive of the objects represented by the indicators. The virtual buttons are graphical elements defining regions of the screen, wherein contact (e.g. touching with a finger) between the operator 107 and the virtual buttons indicates a selection of an object and/or action represented by the virtual button. The selection boxes 624 are virtual buttons associated with indicators, wherein selection of the selection boxes 624 indicates a change in a binary selected/unselected state of the associated indicators. The message input boxes 630 represent and receive textual input from the operator 107, for example, based on a virtual keyboard of the GUI 318.

More specifically, FIG. 7A shows the manage occupant response screen 632, which might be displayed during an initial configuration process for the gunshot detection system and/or at step 406 as described in FIG. 6. In general, the manage occupant response screen 632 presents and receives selections indicating location information, response actions and notification actions pertaining to occupants 103.

The manage occupant response screen 632 includes a series of selection panes 621. The selection panes 621, in general, include selection boxes 630 associated with object indicators 622 representing objects such as locations in the premises 50, response actions to be taken, for example, by the building management systems, and/or notification actions. Selection of one or more of the selection boxes 624 indicates a selection of the objects represented by the object indicators 622.

A location selection pane 621-1 receives selections indicating which locations the response actions and/or notification actions should apply to. For example, the operator 107 can send notifications to only occupants 103 located in the selected locations in the location selection pane 621-1. The location selection pane 621-1 includes five selection boxes 624, each associated with location indicators 622-1 representing different locations within the premises 50, including a cafeteria indicator 622-1-1, a classroom A indicator 622-1-2, a classroom B indicator 622-1-3, a lecture hall indicator 622-1-4 and a gymnasium indicator 622-1-5. In the illustrated example, the selection box 624-2 associated with the classroom A indicator 622-1-2 has a checkmark graphical element indicating selection of classroom A 52-2.

A response action selection pane 621-2 receives selections indicating which actions should be performed by the building management systems of the premises 50. For example, the operator 107 can choose to perform one, some, all, or none of the presented response actions via the response action selection pane 621-2. The response action selection pane 621-1 includes five selection boxes 624, each associated with response action indicators 622-2 representing the response actions, including a shut off lights indicator 622-2-1, a lock down classrooms indicator 622-2-2, an open all doors indicator 622-2-3, an announce evacuation route indicator 622-2-4, and a trap shooter indicator 622-2-5. In the illustrated example, the selection box 624-9 associated with the create evacuation plan indicator 622-2-4 has a checkmark graphical element indicating selection of the option to announce the evacuation plan, for example, by sending instructions to fire notification devices 150-4 to flash strobe lights and/or buzz along the evacuation route.

A notification selection pane 621-3 receives selections indicating different instructional messages to be included in notifications sent to the occupants 103. The notification selection pane 621-3 includes six selection boxes 624, each associated with different notification indicators 622-3, including a shelter in place indicator 622-3-1, a barricade indicator 622-3-2, a silence indicator 622-3-3, nearest exit indicator 622-3-4, a follow evacuation plan indicator 622-3-5, and a custom message indicator 622-3-6. In the illustrated example, the selection boxes 624-11, 624-12, 624-13 and 624-16 have checkmark graphical elements indicating selection of the respective messages instructing the occupants 103 to shelter in place, barricade the door, and stay silent as well as status information and custom instructions indicated by the textual information contained in the custom message box 630, which, in one example, is entered by the operator 107 upon selection of the custom message option.

The manage occupant response screen 632 also includes a send notification button 626 and an execute response button 628. Upon selection of the send notification button 626, notifications with instructional messages selected via the notification selection pane 621-3 are sent to the occupants 103 at the locations selected via the location selection pane 621-1, for example, by text, email, and/or push notifications to the user devices 109. Upon selection of the execute response button 628, instructions are sent to the fire notification devices 150-4 to flash strobe lights and/or buzz along the evacuation route assigned to occupants 103 in classroom A 52-2.

FIG. 7B shows a manage shooter response screen 634, which might be displayed during an initial configuration process for the gunshot detection system and/or at step 406 as described in FIG. 6. In general, the manage shooter response screen 634 presents and receives selections indicating location information and response actions pertaining to active shooters within the premises 50.

Like the manage occupant response screen 632, the manage shooter response screen 634 includes the location selection pane 621-1, the response action selection pane 621-2, and the execute response button 628. Now, however, the response actions will be performed based on the selected location of the shooter and any other known information about the shooter. In the illustrated example, the lecture hall is selected via the location selection pane 621-1, and the trap shooter action is selected via the response action selection pane 621-2. In response to selection of the execute response button 628, instructions will be sent to the access control system control panel 118-1, and in response to the instructions, the access point controllers 150-1 will lock the access points 52 in vicinity to the shooter based on the selected location and/or on known location information for the shooter as indicated by the gunshot event data 194.

Soundbar/Panic Button

In another embodiment, the gunshot detection system 100 might use sound as a non-lethal weapon to disable a shooter. A soundbar 160 can be designed that is triggered when a shot is detected. This can also be triggered by a panic button 162 that a building occupant 103 can push in an emergency. The panic button will also trigger notification to police or cause the access control system to lock or unlock access points 54, among other examples.

Figure 8:
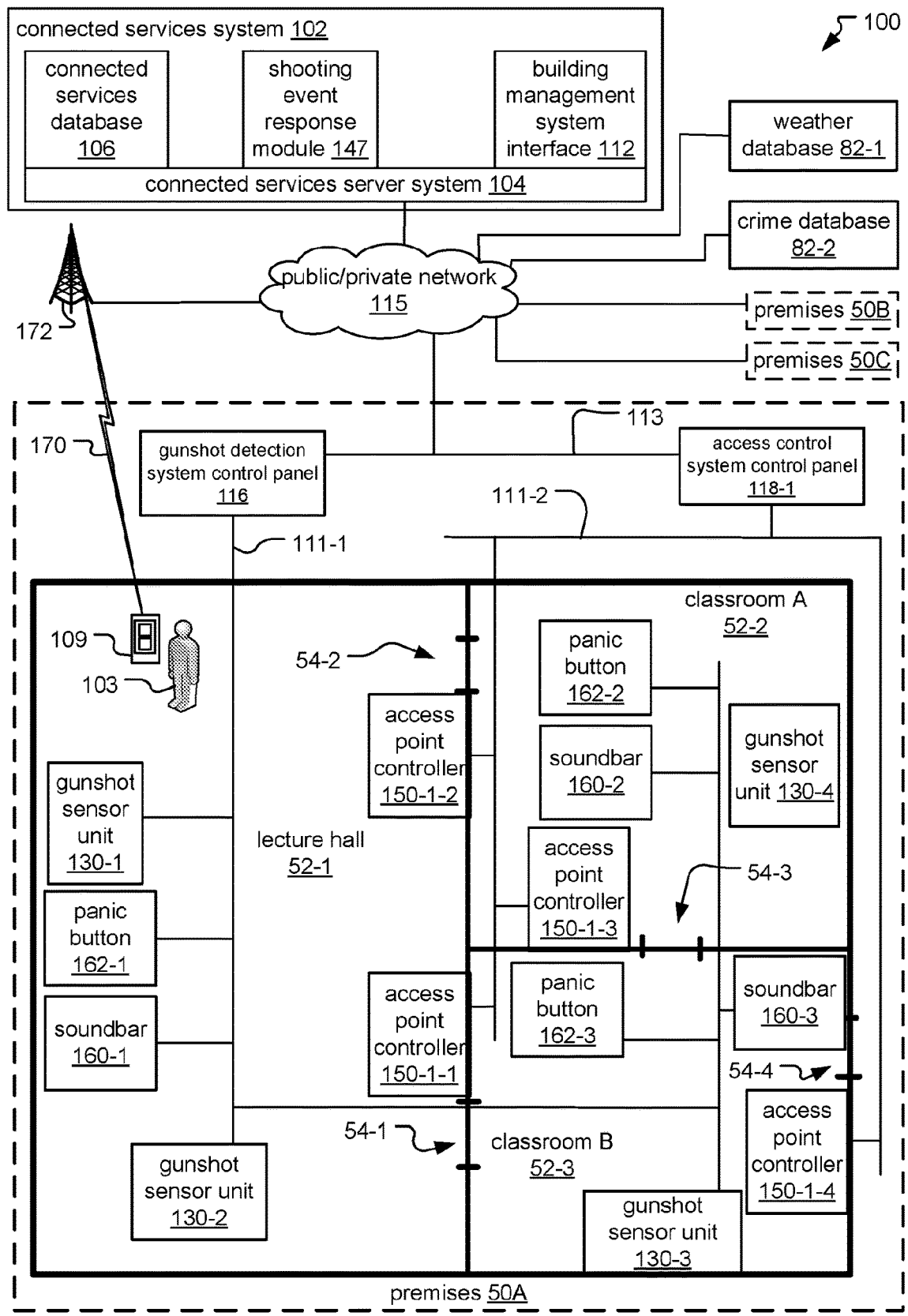
FIG. 8 is a schematic diagram of an exemplary gunshot detection system according to another embodiment in which sound is used as a non-lethal weapon to disable a shooter and/or panic buttons are provided.

FIG. 8 is a schematic diagram of an exemplary gunshot detection system 100 according to another embodiment of the present invention. The gunshot detection system 100 is similar to the system previously described with respect to FIG. 1A. Now, however, the gunshot detection system 100 includes soundbars 160 and panic buttons 162. More specifically, the soundbar 160-1 and the panic button 162-1 are located in the lecture hall 52-1, the soundbar 160-2 and the panic button 162-2 are located in classroom A 52-2, and the soundbar 160-3 and the panic button 162-3 are located in classroom B 52-3. The soundbars 160 and the panic buttons 162 communicate over the gunshot detection communication network 111-1.

In general, the soundbar 160 is a sonic or ultrasonic weapon that emits weaponized (e.g. high-power, high-intensity and/or high-pressure) sound or ultrasound (e.g. via amplifiers and/or speakers), for example, to distract, injure and/or incapacitate an active shooter.

Using the GUI 318, operators 107 can activate the sound bars 160 within one or more rooms 52 to distract an active shooter. Occupants 103 can also manually activate the sound bars 160 directly via the panic buttons 162 located within each of the rooms 52. The panic buttons 162 might also notify police or other first responders, in another example.

Message Priority

In another embodiment, the gunshot detection system 100 includes additional architecture for facilitating passage of messages to and/or from the gunshot detection system 100 and any related building management system. For example, the system might maintain and enforce rules regarding what types of messages (e.g. control messages from the gunshot detection system 100 and/or the other building management systems) are sent first or faster.

Figure 9:
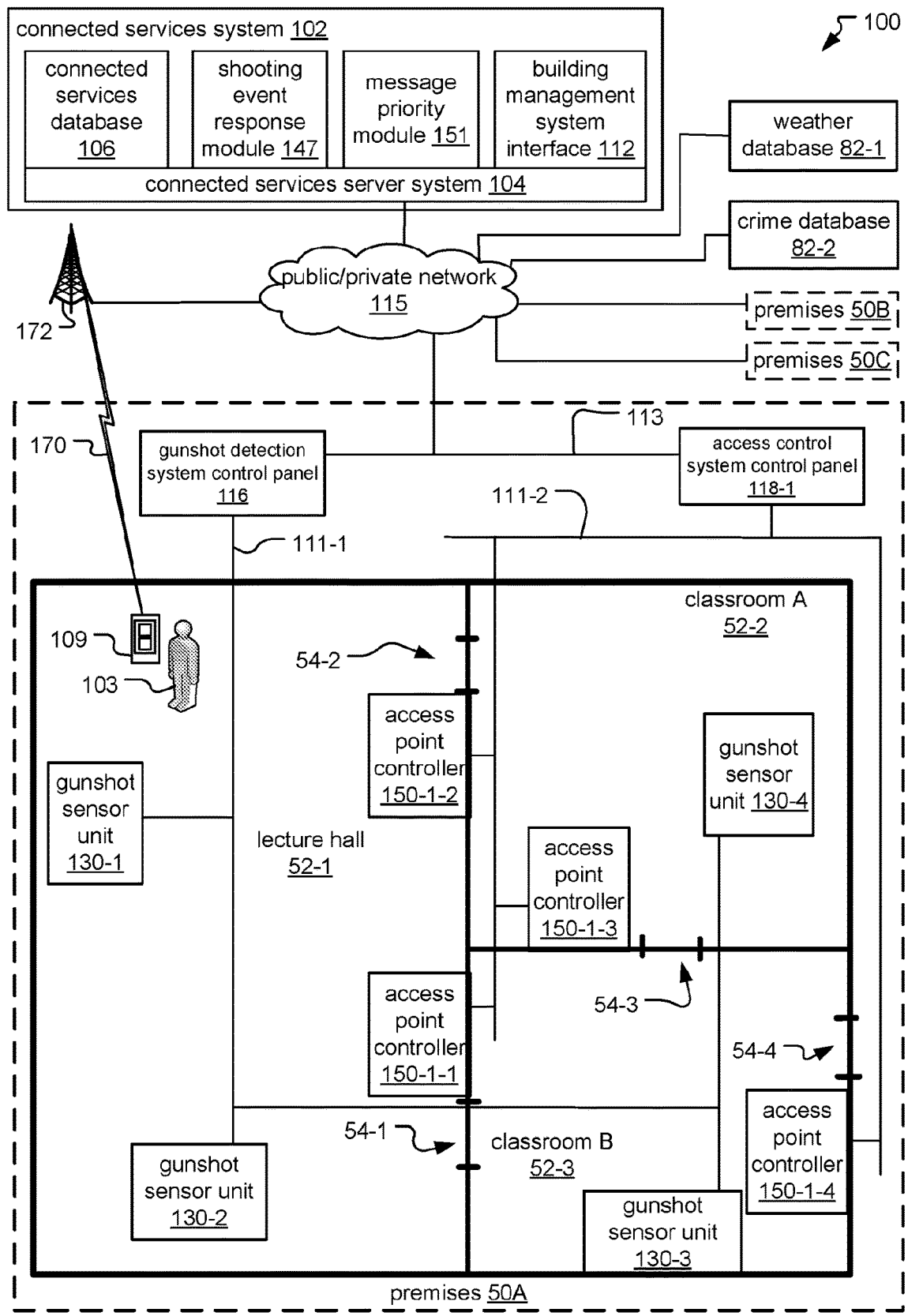
FIG. 9 is a schematic diagram of an exemplary gunshot detection system according to another embodiment that includes architecture for facilitating passage of messages to and/or from the gunshot detection system and any related building management system.

FIG. 9 is a schematic diagram of an exemplary gunshot detection system 100 according to another embodiment of the present invention. The gunshot detection system 100 is similar to the system previously described with respect to FIG. 1A. Now, however, the gunshot detection system 100 includes a message priority module 151. In the illustrated embodiment, the message priority module 151 executes on the connected services server 104. However, it should be noted that the message priority module could execute on the gunshot detection control panel 116, one or more building management system control panels 118, or even the gunshot sensor units 130 and distributed devices 150.

In general, the message priority module 151 facilitates the exchange of messages such as control messages between the gunshot detection system 100 and the building management systems. In one example, the message priority module 151 might queue messages to be sent to the different systems and escalates messages with a higher priority (e.g. messages related to a gunshot detection event) over ordinary messages (e.g. messages related to the ordinary functioning of the gunshot detection system 100 and/or the building management systems). In another example, messages including gunshot event data sent from the gunshot sensor units 130 are identified or ranked according to a hierarchy with respect to other messages containing gunshot event data. Some of these messages might be more important at different times. For example, an unusually load noise detected and reported by a gunshot sensor unit 130 at a business would typically be ranked at a higher priority when occurring within normal business hours versus when occurring outside of normal business hours. In another example, messages sent from a room 52 including many people have priority over messages sent from a known empty room 52.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for detecting and responding to gunshots within a premises, the system comprising:
   gunshot sensor units for detecting gunshots and generating event data for the detected gunshots; and
   an event response module for receiving the event data and sending instructions to building management systems of the premises based on the event data, wherein the building management systems include building automation systems for controlling power, lighting and/or climate conditions for the premises and perform building management functions based on the instructions;
   wherein the event response module sends instructions to the building automation systems to shut down power for the premises, turn off lights and/or control climate conditions for the premises.

2. The system as claimed in claim 1, wherein the building management systems include access control systems for controlling access through access points of the premises, including doors, elevators, escalators and/or turnstiles.

3. The system as claimed in claim 2, wherein the event response module sends instructions to the access control systems to restrict access through certain access points.

4. The system as claimed in claim 2, wherein the event response module sends instructions to the access control systems to allow access through all access points of the premises.

5. The system as claimed in claim 2, wherein the event response module sends instructions to the access control systems to allow access through certain access points.

6. The system as claimed in claim 1, wherein the event response module sends notifications to user devices operated by occupants of the premises based on the event data.

7. A system for detecting and responding to gunshots within a premises, the system comprising:
   gunshot sensor units for detecting gunshots and generating event data for the detected gunshots; and
   an event response module for receiving the event data and sending instructions to building management systems of the premises based on the event data, wherein the building management systems perform building management functions based on the instructions;
   wherein the building management systems include fire alarm systems, and the event response module sends instructions to the fire alarm systems to activate fire notification devices based on the event data and/or predetermined evacuation route information.

8. The system as claimed in claim 7, further comprising a control panel comprising a controller for generating a graphical user interface rendered on a display of the control panel, the graphical user interface enabling an operator of the control panel to indicate response plan information, wherein the event response module sends the instructions to the building management systems based on the response plan information.

9. A method for detecting and responding to gunshots within a premises, the method comprising:
   detecting gunshots and generating event data for the detected gunshots;
   sending instructions to building management systems of the premises based on the event data;
   the building management systems performing building management functions based on the instructions, wherein the building management systems include building automation systems for controlling power, lighting and/or climate conditions for the premises; and
   sending instructions to the building automation systems to shut down power for the premises, turn off lights and/or control climate conditions for the premises based on the event data.

10. The method as claimed in claim 9, wherein the building management systems include access control systems for controlling access through access points of the premises, including doors, elevators, escalators and/or turnstiles.

11. The method as claimed in claim 10, further comprising sending instructions to the access control systems to restrict access through certain access points.

12. The method as claimed in claim 10, further comprising sending instructions to the access control systems to allow access through all access points of the premises.

13. The method as claimed in claim 10, further comprising sending instructions to the access control systems to allow access through certain access points.

14. The method as claimed in claim 9, further comprising sending notifications to user devices operated by occupants of the premises based on the event data.

15. The method as claimed in claim 9, further comprising sending instructions to fire alarm systems of the premises to activate strobe lights positioned along evacuation routes of the premises.

16. The method as claimed in claim 9, further comprising sending the instructions to the building management systems based on response plan information indicated by an operator of a control panel via a graphical user interface of the control panel.

17. A system for detecting and responding to gunshots within a premises, the system comprising:
   gunshot sensor units for detecting gunshots within the premises and generating event data for the detected gunshots; and
   a control panel for receiving the event data, the control panel comprising a controller for generating a graphical user interface rendered on a display of the control panel, the graphical user interface enabling an operator of the control panel to indicate one or more building management functions to be performed by building management systems of the premises based on the event data, wherein the control panel sends instructions to the building management systems to shut down power for the premises, turn off lights and/or control climate conditions for the premises based on the event.

18. A method for detecting and responding to gunshots within a premises, the method comprising:
   detecting gunshots within the premises and generating event data for the detected gunshots;
   generating a graphical user interface rendered on a display of a control panel receiving the event data, the graphical user interface enabling an operator of the control panel to indicate one or more building management functions to be performed by building management systems of the premises based on the event data; and
   sending instructions to the building management systems to shut down power for the premises, turn off lights and/or control climate conditions for the premises based on the event data.

* * * * *